US011922974B1

(12) United States Patent
Plankey et al.

(10) Patent No.: US 11,922,974 B1
(45) Date of Patent: *Mar. 5, 2024

(54) SYSTEM AND METHOD FOR CREATING AND MANAGING MULTIMEDIA SALES PROMOTIONS

(71) Applicants: James E. Plankey, Arlington Heights, IL (US); Thomas G. Gallaher, Lake St. Louis, MO (US)

(72) Inventors: James E. Plankey, Arlington Heights, IL (US); Thomas G. Gallaher, Lake St. Louis, MO (US)

(*) Notice: Subject to any disclaimer, the term of this patent is extended or adjusted under 35 U.S.C. 154(b) by 166 days.

This patent is subject to a terminal disclaimer.

(21) Appl. No.: 17/590,618

(22) Filed: Feb. 1, 2022

Related U.S. Application Data

(63) Continuation-in-part of application No. 16/938,941, filed on Jul. 25, 2020, now Pat. No. 11,308,527, (Continued)

(51) Int. Cl.
*G11B 27/036* (2006.01)
*G06Q 30/0241* (2023.01)
(Continued)

(52) U.S. Cl.
CPC ........ *G11B 27/036* (2013.01); *G06Q 30/0276* (2013.01); *G10L 13/08* (2013.01); *G11B 27/034* (2013.01); *G11B 27/34* (2013.01)

(58) Field of Classification Search
CPC ..... G11B 27/036; G11B 27/034; G11B 27/34; G06Q 30/0276; G10L 13/08
See application file for complete search history.

(56) References Cited

U.S. PATENT DOCUMENTS 6,820,055 B2 * 11/2004 Saindon ................. G10L 15/26
704/235
9,535,891 B2 * 1/2017 Raheja ................. G06F 40/166
(Continued)

*Primary Examiner* — Angelica Ruiz
(74) *Attorney, Agent, or Firm* — CreatiVenture Law, LLC; Dennis J M Donahue, III; Kevin Staed

(57) ABSTRACT

A multimedia dashboard application runs on a computing device that is in networked communication with a seller's inventory database and is also in operative communication with the seller's distribution server. The multimedia dashboard application includes an item selector, recording modules, multimedia editors, and a distribution controller. Without adding or opening another application, the multimedia dashboard application records multimedia segments, selects segments to be uploaded to and downloaded from the inventory database, and edits the segments to produce multimedia promotions. The multimedia dashboard application also controls distribution of the promotions. The multimedia dashboard application can add closed-captioning, voiceover tracks, and background effects to the promotions. The multimedia dashboard application can use a video around a product to produce 360° views of the product and can combine a group of photos into a stitched video. The system can be used collaboratively with multiple sales representative sharing multimedia segments through the inventory database.

20 Claims, 26 Drawing Sheets

Related U.S. Application Data which is a continuation-in-part of application No. 15/865,029, filed on Jan. 8, 2018, now Pat. No. 10,726,451, which is a continuation-in-part of application No. 14/313,171, filed on Jun. 24, 2014, now Pat. No. 9,865,007, which is a continuation-in-part of application No. 13/858,730, filed on Apr. 8, 2013, now abandoned.

(60) Provisional application No. 63/147,576, filed on Feb. 9, 2021, provisional application No. 62/518,216, filed on Jun. 12, 2017, provisional application No. 61/838,684, filed on Jun. 24, 2013, provisional application No. 61/641,737, filed on May 2, 2012.

(51) Int. Cl.
*G10L 13/08* (2013.01)
*G11B 27/034* (2006.01)
*G11B 27/34* (2006.01)

(56) References Cited

U.S. PATENT DOCUMENTS

| | | | | |
|---|---|---|---|---|
| 2011/0137976 | A1* | 6/2011 | Poniatowski | H04N 21/4334 707/769 |
| 2016/0246765 | A1* | 8/2016 | Hundemer | G06F 40/232 |
| 2017/0272818 | A1* | 9/2017 | Gattis | H04N 21/4415 |
| 2017/0332035 | A1* | 11/2017 | Shah | G10L 15/22 |

* cited by examiner

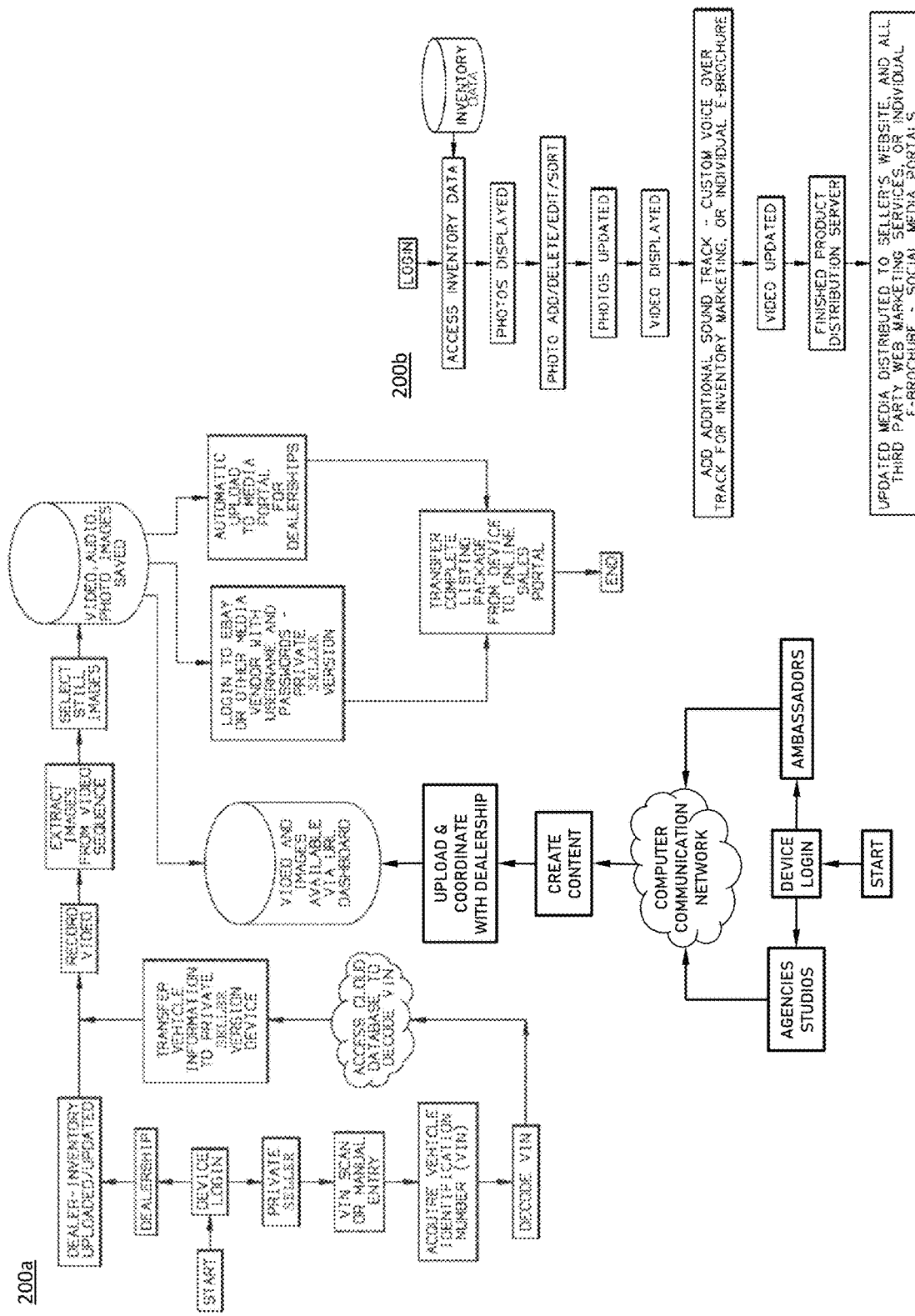

Fig. 2D

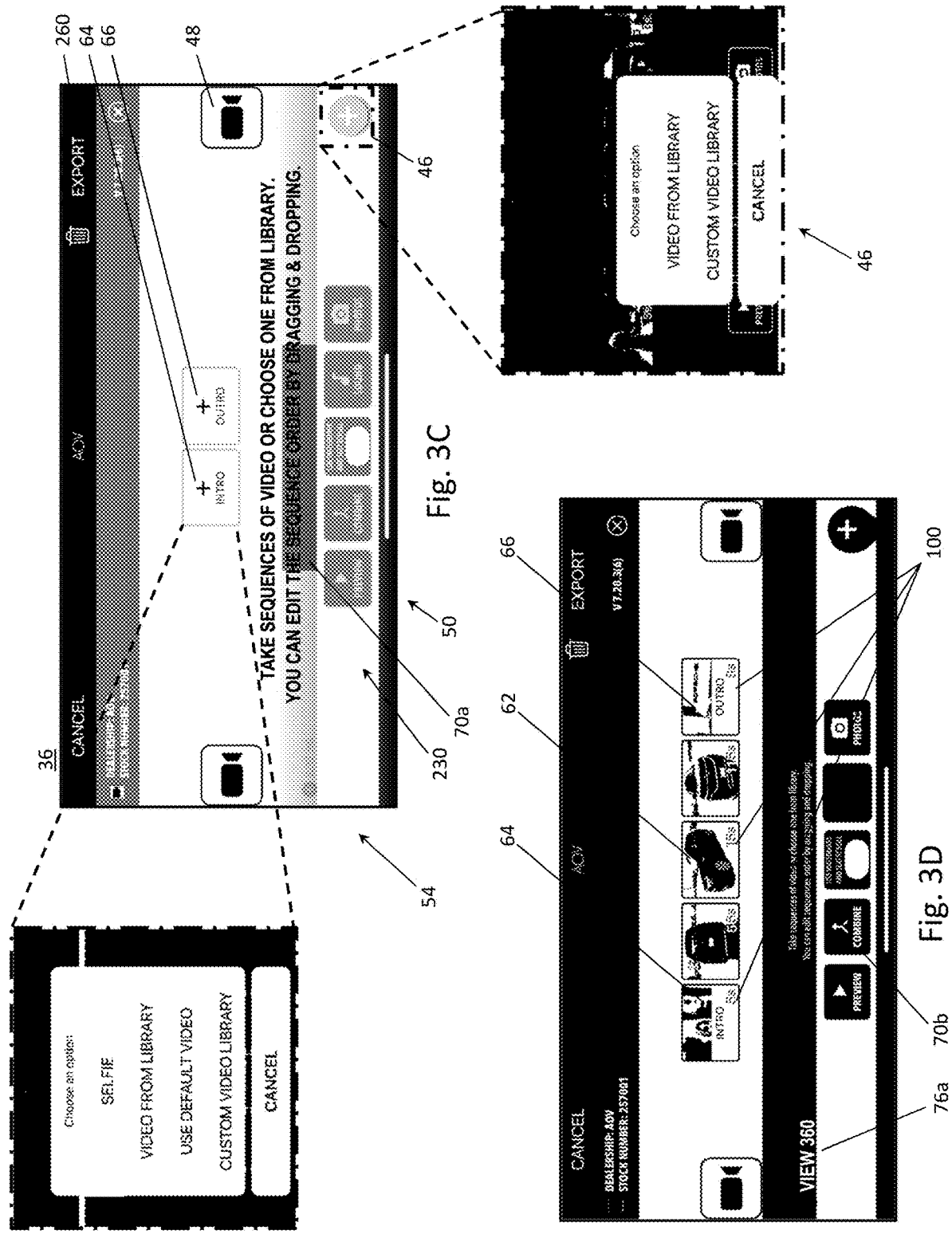

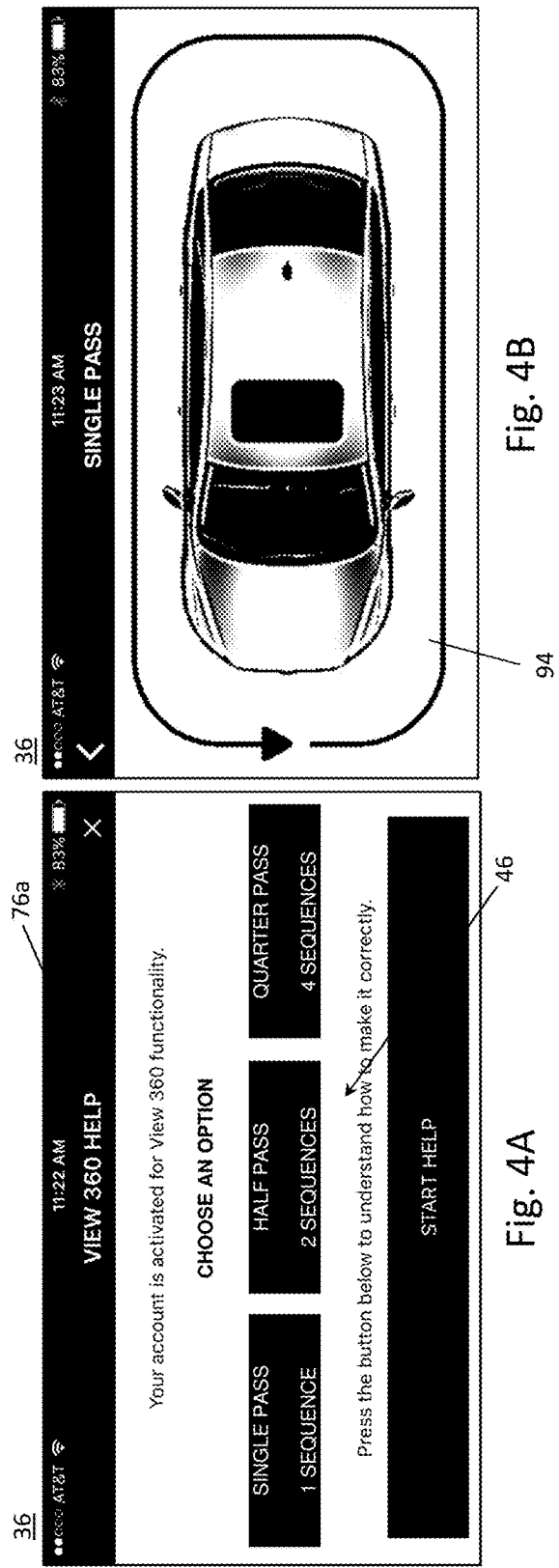
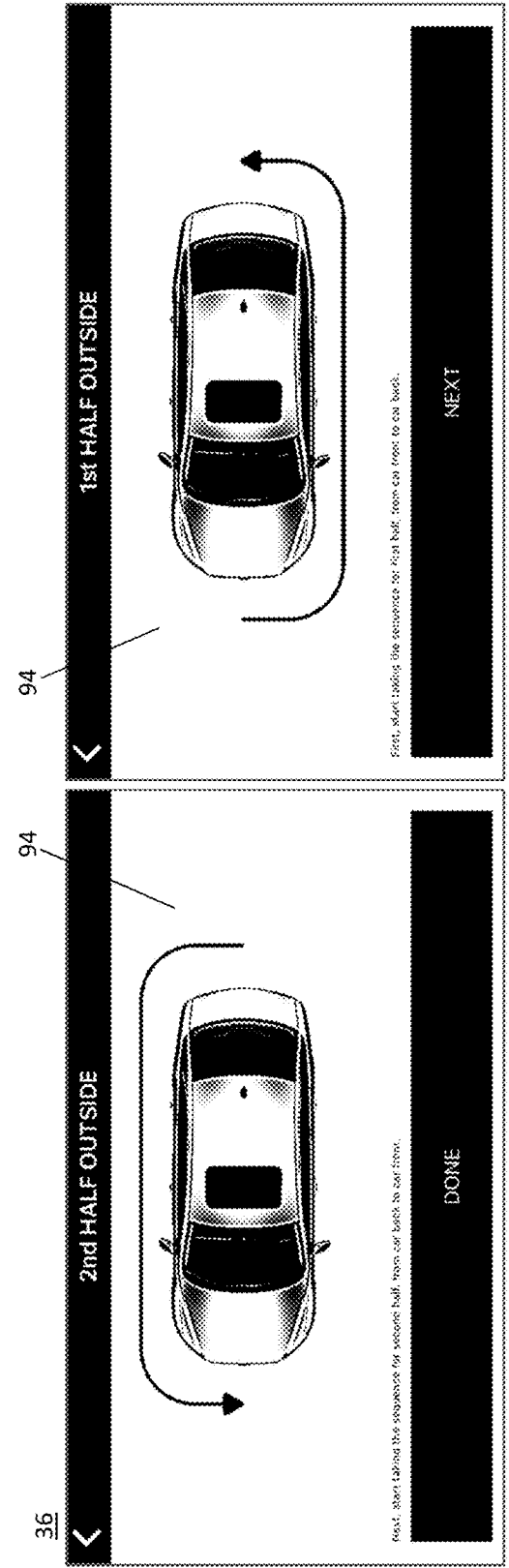

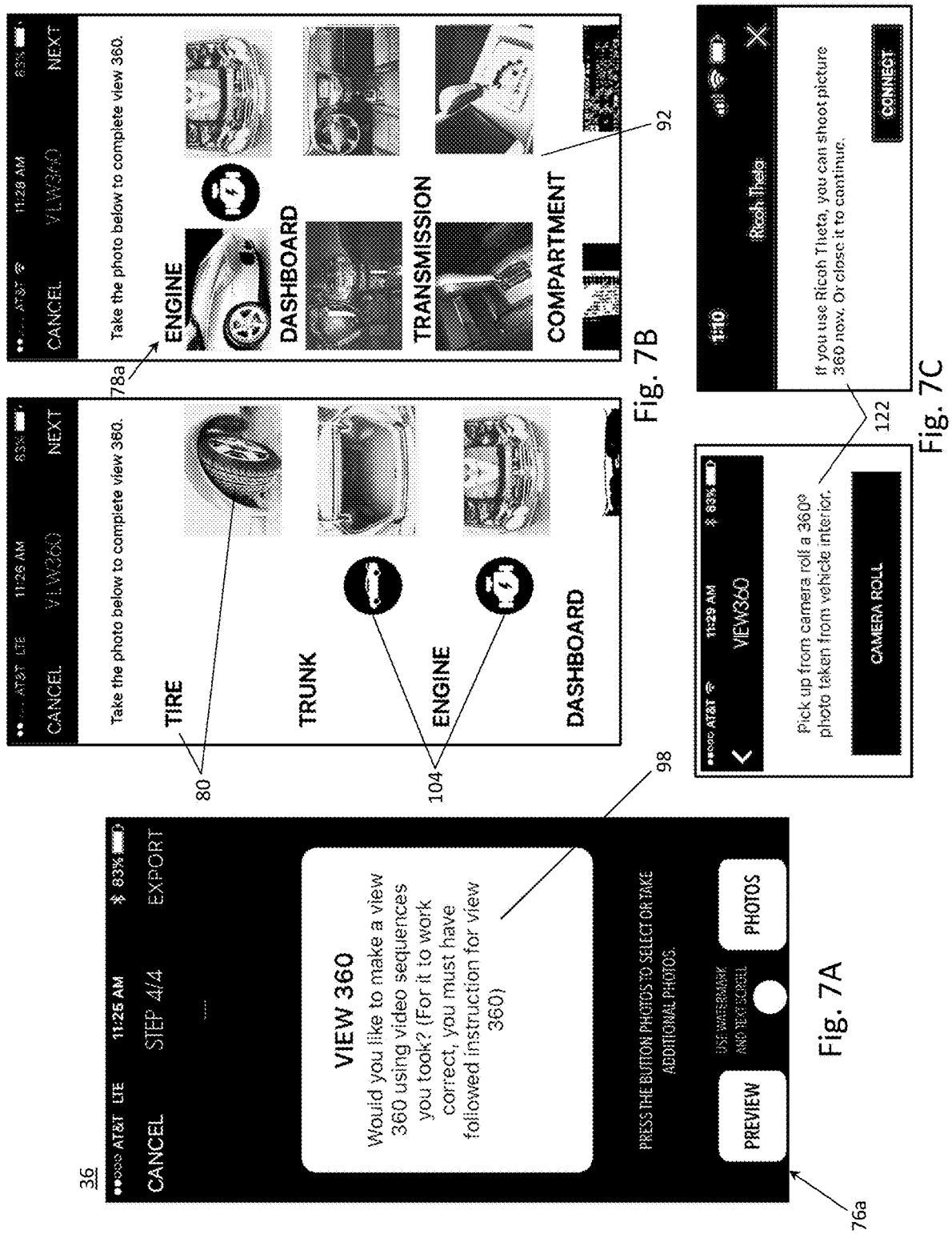

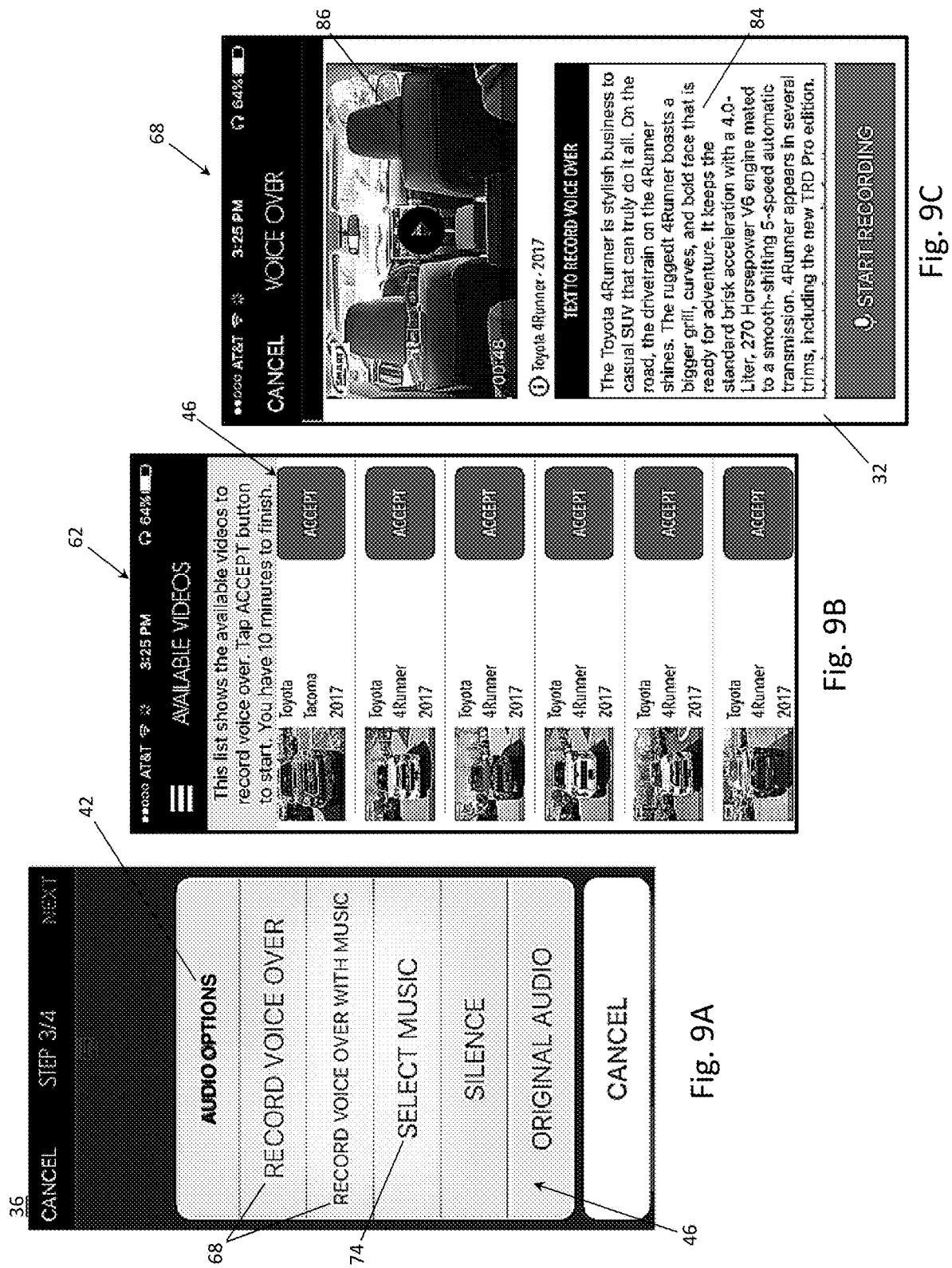

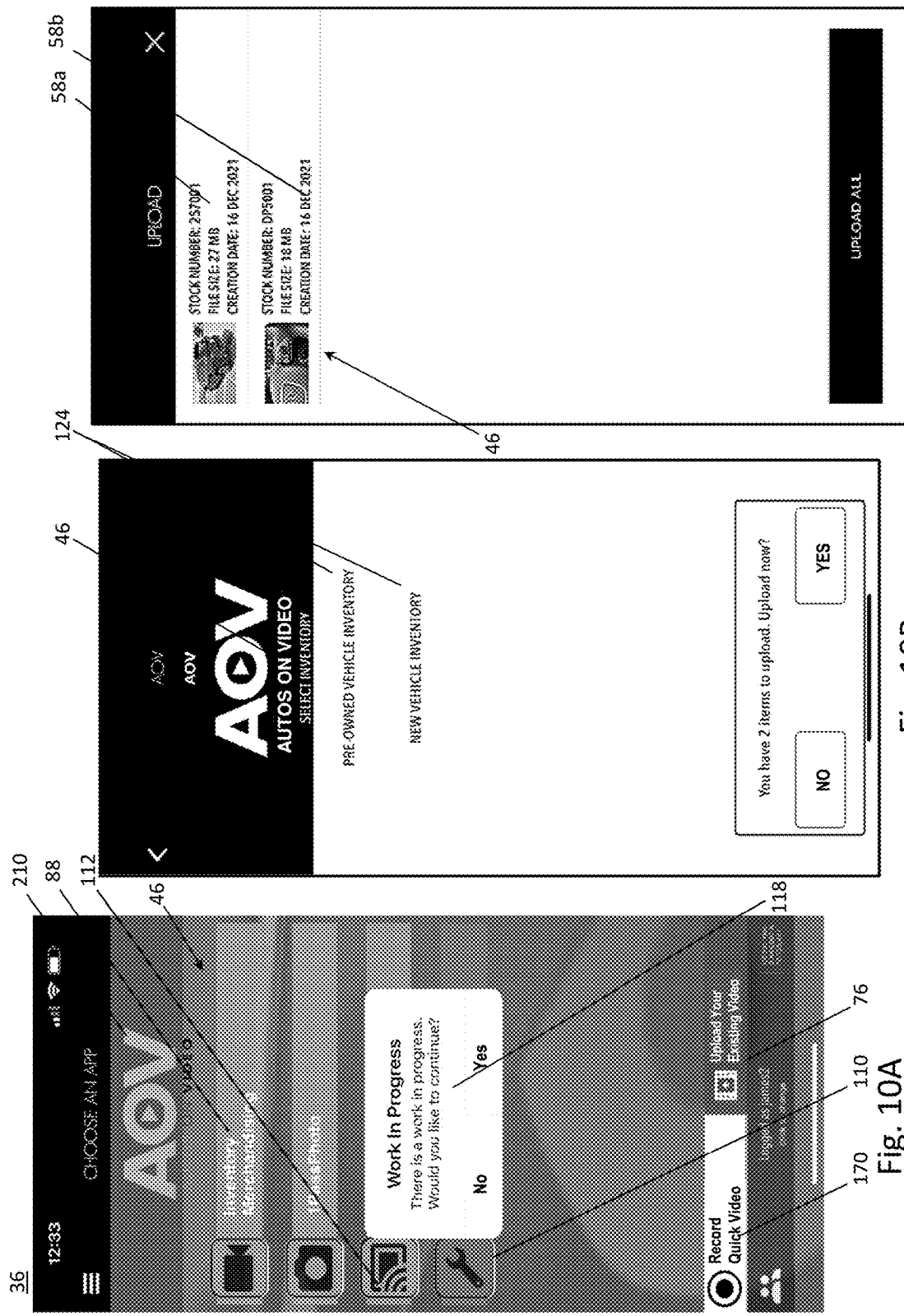

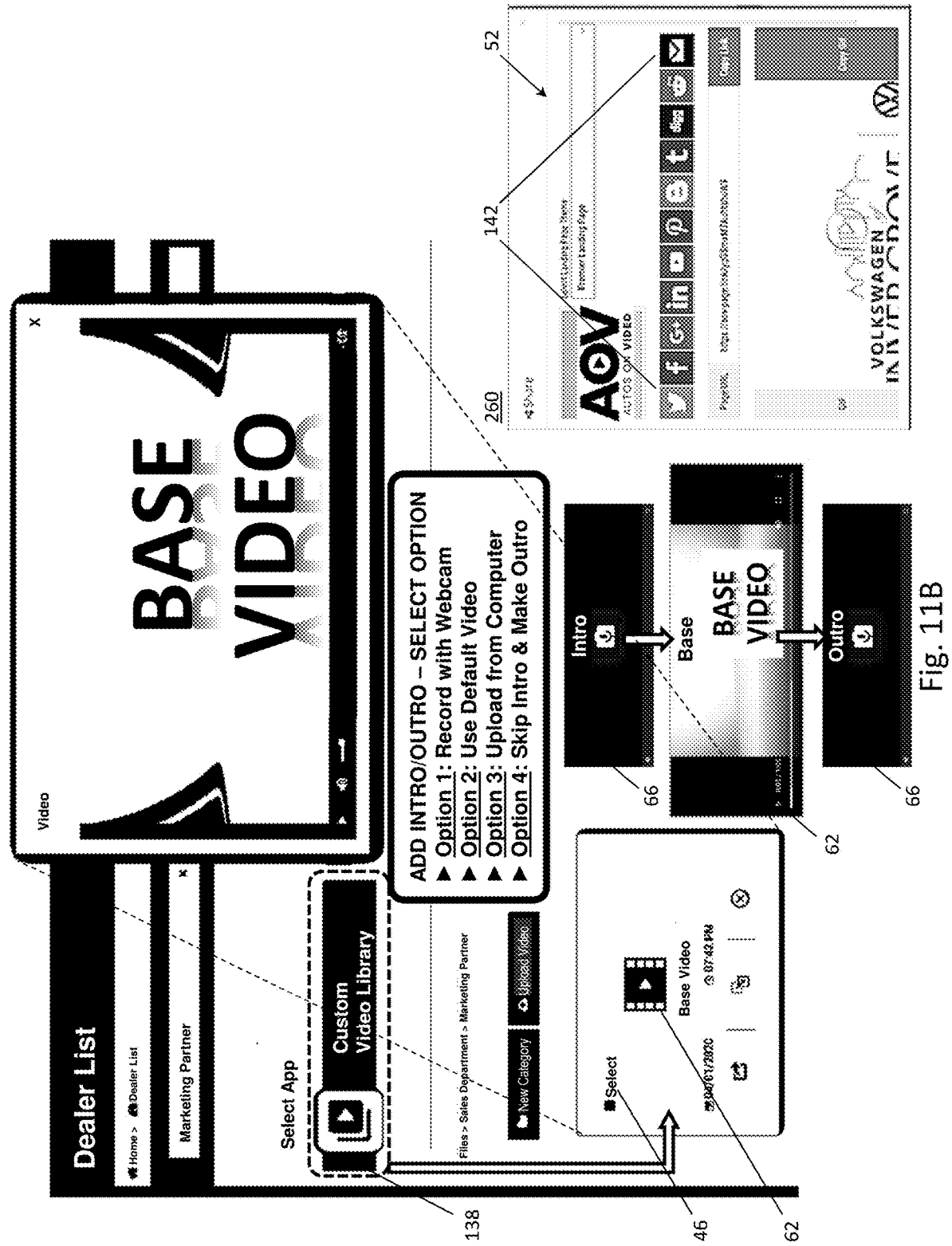

SYSTEM AND METHOD FOR CREATING AND MANAGING MULTIMEDIA SALES PROMOTIONS

CROSS-REFERENCE TO RELATED APPLICATIONS

This application claims priority to U.S. Provisional Pat. App. No. 63/147,576 filed on Feb. 9, 2021 and is a continuation-in-part based on U.S. patent application Ser. No. 16/938,941 filed on Jul. 25, 2020 which is a continuation-in-part of U.S. patent application Ser. No. 15/865,029 filed on Jan. 8, 2018, issued as U.S. Pat. No. 10,726,451 on Jul. 28, 2020, which is a continuation-in-part of U.S. patent application Ser. No. 14/313,171 filed on Jun. 24, 2014, issued as U.S. Pat. No. 9,865,007 on Jan. 9, 2018, and which claims priority to U.S. Provisional Pat. App. No. 62/518,216 filed on Jun. 12, 2017. U.S. patent application Ser. No. 14/313,171 is a continuation-in-part of U.S. patent application Ser. No. 13/858,730 filed on Apr. 8, 2013 and claims priority to U.S. Provisional Pat. App. No. 61/838,684 filed on Jun. 24, 2013. U.S. patent application Ser. No. 13/858,730 claims priority to U.S. Provisional Pat. App. No. 61/641,737 filed on May 2, 2012.

STATEMENT REGARDING FEDERALLY SPONSORED RESEARCH

Not Applicable.

APPENDIX

Not Applicable.

BACKGROUND OF THE INVENTION

Field of the Invention

The present invention relates to the field of sales, more particularly, to the field of multimedia sales promotions through a software and method for selling products and services through the software that enables a user to create, manage, upload and display information, videos, and pictures on a web-based media portal from a single system.

Related Art

It is often useful in sales to provide immersive promotional materials to display products to potential buyers. This is particularly true in automotive sales. It is well known in the field that ads featuring pictures of vehicles will attract more attention than text alone, and if at auction, command a higher price. This is true in part because it is important for the customer to get a detailed understanding of the visual condition of the vehicle. Even more importantly, detailed photographs implant imagery of the vehicle in the prospective buyer's mind and implant them with the fantasy of owning the vehicle.

Automotive retailers have taken this concept a step further and are now integrating video tours of their vehicles in their classifieds and promotional materials. Video is becoming the first media choice for prospective buyers on the web and mobile devices. Approximately eighty percent (80%) of all auto shoppers pursue online videos in their research, and half of all car shoppers watch at least thirty (30) minutes of video during the buying process.

Moreover, video has the potential to motivate buyers like no other media. A video gives shoppers the sense that they're standing beside the car. They can see it, hear it, learn about it, almost touch it—they may even dream about it. A well-made video helps a buyer visualize owning the car. Buyers will research countless sites before narrowing their selection, and when they're ready to move they typically only visit one or two dealers. That is why it is absolutely critical for retailers to make an impression on potential buyers with their classifieds.

Organizing the various media on the vehicles in an inventory is a difficult task. This is particularly true when video or pictures are custom edited for particular consumers, and multiple salespersons would like to make changes to the content. In the current market, retailers don't have a complete custom solution to edit photos, incorporate additional sound tracks to existing video, and accommodate multiple users. Once the original photos and video are taken, they cannot be edited and organized by the retailer in a convenient manner. A voiceover may not be done in the field because of ambient noises, such as wind, cars, airplanes, or other noises that distort the recording. Accordingly, there is a need in the art for a convenient way to organize multimedia promotional materials for large stocks of merchandise.

Another problem arises in the art as marketing a product on different web portals including a website, such as YouTube®, Facebook®, cars.com, etc., requires multiple logins, which may be time consuming and tedious. For dealerships, the industry standard is to take photos first, and then the photos may be processed through an elaborate PowerPoint styled stitching to used in place of a video. Further, photos and video must be shot on multiple devices, including a camera, video camera, or a smartphone, then the photos and videos need to be uploaded to a desktop computer or laptop computer. With the computer, photos, and video can be edited, then media matched to VIN, or stock number, then uploaded to an appropriate retailer website, online shopping bazaar, or other web vendor. For the private seller, media can be loaded, but only one vendor at a time. The current process is time consuming and requires a user to take multiple steps. Further, the current process limits a private seller to upload the content to one web vendor at a time and video, photos and audio may be limited or missing altogether. As can be seen, there is a need for easily uploading of information to a web-based media portal from a single system.

An example of a known multimedia sales promotion systems in the prior art can be seen in US Pat. App. No. 2001/0034690 by Ron Joseph which teaches a computer system that allows a user to add images on a display for use in a multimedia sales promotion that is hosted on a distribution server. However, the Joseph reference and similar systems in the prior art do not teach or suggest the use of a multimedia dashboard application that is in networked communication with the distribution server and that can also operate a camera and microphone within the system to create multimedia segments such as photos, video, and audio recordings, nor do they teach or suggest using a multimedia editor within the same dashboard to modify the multimedia segments and produce the multimedia sales promotion, nor do they teach or suggest an inventory database that is accessed multiple users running by the same dashboard application to produce unique multimedia sales promotions such as by using the same multimedia body segment with customized intros and outros that the users can produce on the dashboard application which they also use to record their intros and outros, nor do they teach or suggest that the same multimedia dashboard application that is used to create and edit the multimedia segments and promotions can manage promotions stored on the inventory database and control the release of the promotions through the distribution server.

In known systems, such as in Joseph and the systems described in US Pat. Pub. No. 2010/0030578 by Siddique et al. and US Pat. Pub. No. 2007/0028172 by Greer et al., users could work with a centralized coordinator to edit their multimedia materials and upload the completed multimedia promotion to a distribution server. However, the centralized coordinator still works on a multimedia editor that is apart from the recording system and also apart from the distribution server. Therefore, there is no way that the users can collaborate with each other or even with the centralized coordinator using a single multimedia dashboard application that controls recording multimedia segments, editing the multimedia segments and producing the multimedia promotions, and distributing the multimedia promotions for an end-to-end solution. In prior art systems, it is not possible for one user to record multimedia segments with the dashboard application and upload the segments to an inventory database for another user to edit into a multimedia promotion with the same dashboard application or control the distribution with the dashboard application. Accordingly, there is a need for a single dashboard software application that can perform all of the functions in an end-to-end solution without the need for any separate software applications to be added to the device or otherwise run with the dashboard application.

Additionally, according to the teachings of the prior art, once a finalized multimedia promotion is uploaded to a distribution server, the various multimedia segments are not available to the users for editing the multimedia promotion with their own customized multimedia segments, such as unique intro or outro videos, different soundtracks, and personalized voiceovers. In the prior art systems, the central coordinator would have to use the separate multimedia editor apart from the management of the distribution server to make the customized edits and then upload each one of the final customized multimedia promotions to the distribution server for the respective users. According to the particular teaching of Siddique, the user would have to add or otherwise open and run another application apart from the Application and File Management System/Virtual Operating System (AFMS/VOS) in order to perform all of the various functions for producing and distributing the multimedia promotions as well as other functions with vendors, such as retrieving multimedia segments from the vendors, e.g., professional videos and influencer videos from marketing agencies and brand ambassadors, respectively. Thus, there is a need for system integration or connectivity between systems to coordinate the separate tasks of recording multimedia segments, editing the segments into multimedia promotions, retrieving multimedia segments from vendors, distributing the multimedia promotions within an end-to-end software solution without having to add or otherwise open and run another software application with the dashboard application.

According to the general teaching in the multimedia sales promotion industry, prior to the present invention, a camera or other recording device would be used to record the multimedia segments which would then be uploaded to a computer system for editing by a multimedia editor to create the multimedia marketing materials but that does not provide a user with control of multimedia recording for new multimedia segments. The multimedia marketing materials would then be transferred to a different computer system for storage and may also be used as the distribution server with its own controlling software program, but neither the multimedia recording system software nor the multimedia editor system software would have any control or access into the distribution server. Therefore, if a user wanted to create a customized multimedia promotion with a unique intro and outro, the multimedia segments would need to be created with the recording system, and the editing would have to be performed using the multimedia editor, and then the final customized promotion could be uploaded to the distribution server. Similarly, if other users in a sales force wanted their own customized multimedia promotions, the separate recording systems and editor would need to be used to produce the promotions.

Even in those prior art multimedia sales promotion systems in which a smartphone camera has its own internal photo editing module that can be used in editing the images for the promotions, the user cannot select and combine the edited multimedia segments within the photo editing module. Instead, the user would have to switch software applications to a separate multimedia editing application combine the multimedia segments so they form the multimedia promotion that is distributed directly to potential customers or uploaded to one or more websites or social media accounts. As a particular example, background effects have traditionally been performed with manual operations that use a photo editing software program which is separate from the photo application that had captured the photographic image. With the incorporation of depth mapping technologies into smartphone camera systems, smartphone users have been able to use the camera app to take a picture and use the editing module in the camera app to modify the blurring of the foreground and background in a semi-automatic mode of operation. In some current smartphones and tablet computers, the editing module provides the user with a menu option for the blurring tool and slider bar controller allows the user to adjust the depth of field for the image; a shorter depth of field reduces the focal length for the image thereby decreasing the sharpness of the background and increasing its blurring. and a longer depth of field increases focal length for the image thereby increasing the sharpness of the background and decreasing its blurring. Some camera applications also allow the user to preselect various background images or a blurred background filter. However, none of these prior art systems allow the user to take photos in the same multimedia dashboard application in which the photos are edited, selected, and combined into a multimedia promotion as well as distributing the multimedia promotion. Accordingly, it would be an additional benefit to incorporate into a multimedia dashboard application some improved photo editing tools and at least partially automating the tools as these tools are developed for camera systems and standalone multimedia editing programs.

In another limitation of prior art multimedia sales promotion systems, the process to add closed captions to videos is inefficient, requiring cumbersome and time consuming manual tasks. According to the manual processes, required by current closed caption services, the user uploads an audio-video (A/V) file to an online transcription service, such as Rev.com, that transcribes the audio portion into a text file ("video text tracks"—vtt format) that is time-synchronized with the audio and video. The online transcription service typically includes typographical error checks and punctuation checks which results in a turn-around time of anywhere from several hours to a full business day (i.e., 6-24 hours or longer). For many multimedia sales promotion systems, the user would first have to download the A/V file to their local computer because they cannot upload the A/V file directly from a A/V file repository that is maintained by their multimedia sales promotion system. The user must then download the vtt-format file only back from transcription service. Since the user is not given the option to download the A/V file that had been uploaded with the corresponding vtt-format file, the user has to upload the A/V file and the vtt-format file to an online video editor and compressor service, such as the Handbrake service (or run the program locally), to merge the files back together into a final A/V file with the merged vtt-format file. The user downloads or otherwise stores the merged A/V-vtt file and uploads the merged file back into the multimedia sales promotion system. Users of multimedia sales promotion system would be more willing to add closed captions to their videos if they did not have to perform this complicated and time-consuming process. Closed captioning is particularly important to hearing impaired community that rely on assisted listening systems (ALS). Accordingly, to avoid the complexities and inefficiencies of the prior art systems and make multimedia sales promotions more readily available, it would be preferable to automate the closed captioning tasks so that the computer system performs all of the work to generate the closed captions after the user pushes a single button starting the automated process.

The necessary use of separate systems for the recording, editing, and distribution of multimedia promotions according to the previously known systems results in significant expenditures of time and expenses to make even a single multimedia promotion. The additional time and costs for customized promotions with unique intros and outros for all of the members of a sales force makes it prohibitive to use current system to produce customized promotions. Accordingly, there remains a need to provide some type of integration of and/or connectivity between these recording, editing, and distribution systems to permit a more efficient end-to-end solution for the production and distribution of multimedia sales promotions. There also remains a need for a system in which customized multimedia promotions can be produced more efficiently, shorter time and lower cost, than in current systems. Finally, it would be beneficial if the end-to-end solution simplifies the tasks necessary to create and produce the multimedia promotions.

SUMMARY OF THE INVENTION

A system and method for creating and managing multimedia sales promotions having a multimedia dashboard that is operated through a mobile computing device that is in networked communication with an inventory database for a particular retailer and is in operative communication with a distribution server. In the preferred embodiment, the computing device is a handheld smartphone or tablet computer operating the fully integrated multimedia sales promotion system which allows capturing images, video and audio for use in a multimedia sales promotion. The computing device has an interactive display that allows a user to select the multiple tools displayed on the multimedia dashboard including video recording, photography, photo and video editing, adding music and voiceover to the created multimedia content, an inventory selector in communication with the inventory database operated and/or used by the particular retailer and a promotion controller in communication with the distribution server to deliver the multimedia promotions.

The multimedia dashboard application operating as a part of the system can be in networked communication with an inventory database and a distribution server or may access the storage memory of the computing device which is running the dashboard application and which may locally store the data, photos, videos or other sales information used in creating the multimedia sales promotion. Accordingly, the user can access the sales data and upload it to the multimedia dashboard to be displayed thereon and manipulated by the user through the user interface. The multimedia dashboard application also allows users from within a business to efficiently collaborate with authorized marketing partners who are vendors of the business. The inventory database serves as a central repository for the content while the multimedia dashboard application serves as a central catalogue interface for the management, review, and approval of the content.

The multimedia dashboard accesses photos and videos in the inventory database or memory which are automatically arranged by the system and can be edited by the user through the interactive user interface within the multimedia dashboard. The user can edit and format the data into a custom multimedia promotion within the multimedia dashboard. Accordingly, the system also has a computer processor and memory unit for processing and storing input data that is either obtained from the inventory database or is obtained through the camera or other input device, such as a microphone which is used for voiceovers.

In another aspect of the multimedia system, the system allows a user to convert the individual photos and videos into a custom multimedia promotion which may include videos, audio, photos and item details such as specifications and text descriptions. The custom promotions are created within the system and are uploaded to outside platforms that may include social media sites or similar platforms accessible by a third party. These multi or single media promotions are created and edited in the multimedia editor which is part of the multimedia systems and controlled by the computer processor of the computing devices. For example, a user may create a custom promotions video that includes a preset introduction to a product followed by the body of the video showing the product compiled from inputted photos, video and/or other data which concludes with a standardized outro. Accordingly, the user can create a unique body portion and automatically format the custom body into a completed promotions video. The system also provides improved efficiencies in exporting multimedia sales promotions to different types of websites so that postings on some websites can be automatically modified to include a graphic overlay on the multimedia sales promotions while postings on other websites do not include any graphic overlay.

In operation, the custom video or other automatically formatted multimedia promotion can be two-dimensional images as well as three-dimensional images presented in a "View 360" tool which projects a 360° display on the dashboard. The 360° display allows the user to interactively view the product where the body is created from multiple videos, video frames or still photographs which are formatted into a matrix that offers a 360° view of the item. For example, a car dealership may create a promotions video that offers an interactive 360° view of a vehicle that is for sale. Additionally, the View 360 tool may also be combined with one or more "hotspots" on which a user may click to bring up particular photographs, detailed videos or other information that may be useful to a buyer as well as allowing the user to move between the various views of the 360° display.

The innovative method may also include adding and editing individual photos for use in a collection related to an individual item in the inventory database. Conversely, a user may delete some photos and videos within the collection during editing and replace the deleted multimedia with new multimedia. Additionally, the method may further include sorting the collection of multimedia into a sales promotion and displaying at least one item from the inventory database.

This system presents sellers with the ability to customize their media marketing in-house, eliminating the need to outsource this process. It also allows retailers to generate more immersive and custom-tailored promotional materials that more effectively entice potential buyers. Furthermore, this system tracks the changes that multiple users make to the promotional materials, increasing the pool of creative input and improving the organization of the system and enables easier division of labor, as one user can shoot video and photos, while user edits the videos and photos to finalize the multimedia sales promotion. The system can also be used to create how-to information and tutorials due to its simple yet powerful editing and production tools. The system enables retailers to easily perform post-editing of media segments in a controlled environment such as a quiet office. The system can also communicate service information directly to customers having maintenance or other service performed, such as with vehicles being serviced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1A, 1B and 1C are flowcharts of the present invention's methods.

FIGS. 2C and 2D are screenshots of the full-screen multimedia dashboard with detail views of the stitched audio-video tool and an automated voiceover, respectively.

FIGS. 3C, 3D, and 3E are screenshots of the multimedia dashboard smartphone video creation and editing screens with detail views of pop-up windows for intro and outro videos and the video source options.

FIGS. 4A and 4B are screenshots of the multimedia dashboard View 360 smartphone help screen with sequence selection options and a single-sequence smartphone video prompt screen, respectively.

FIGS. 5A and 5B are screenshots of the multimedia dashboard View 360 two sequence smartphone video prompt screens.

FIGS. 7A, 7B, and 7C are screenshots of the multimedia dashboard View 360 smartphone prompt screen, silhouette prompt screen, and camera roll access prompt screen, respectively.

FIGS. 9A, 9B and 9C are screenshots of the multimedia dashboard audio creation prompt screen, video selection smartphone screen and voiceover recording screen, respectively.

FIGS. 10A, 10B and 10C are screenshots of the multimedia dashboard smartphone work-in-progress screen, upload prompt screen and upload screen, respectively.

FIG. 11B is a schematic representation of the multimedia promotion generation process and export options using a base video from the custom video library.

DETAILED DESCRIPTION OF THE PREFERRED EMBODIMENTS

The following description of the preferred embodiment(s) is merely exemplary in nature and is in no way intended to limit the invention, its application, or uses.

A system 10 for creating and managing multimedia sales promotions 100 having a computing device that is in communication with an inventory database. The inventory database stores data corresponding with items being sold by a retailer that may include photos and videos of the items as well other information that may be relevant to a consumer. The computing device is in networked communication with the inventory database which permits bidirectional access between the database and computing device wherein data in the database can be accessed from the computing device, including the ability to download data and uploaded data. Preferably, the present invention also includes a distribution server that publishes the multimedia sales promotions on web portals, directly emails the promotions to potential customers and/or marketing partners, or otherwise makes the promotions available such as by communicating links to websites hosting the promotions. The inventory database may be hosted on the distribution server or may be in networked communication with the distribution server. The present invention is particularly disclosed with reference to the sale of vehicles through a car dealership, and it will be evident that the innovative aspects of the present invention can be used in any type of sales environment for any type of product, such as retail sales through a retail website and individual sales through one or more online shopping bazaars, such as E-bay®, cars.com, Autotrader®, Amazon®, Craigslist®, Etsy®, Google® Shopping, Facebook® Marketplace, Overstock®, Zappos®, Alibaba®, etc.

Figure 1C:
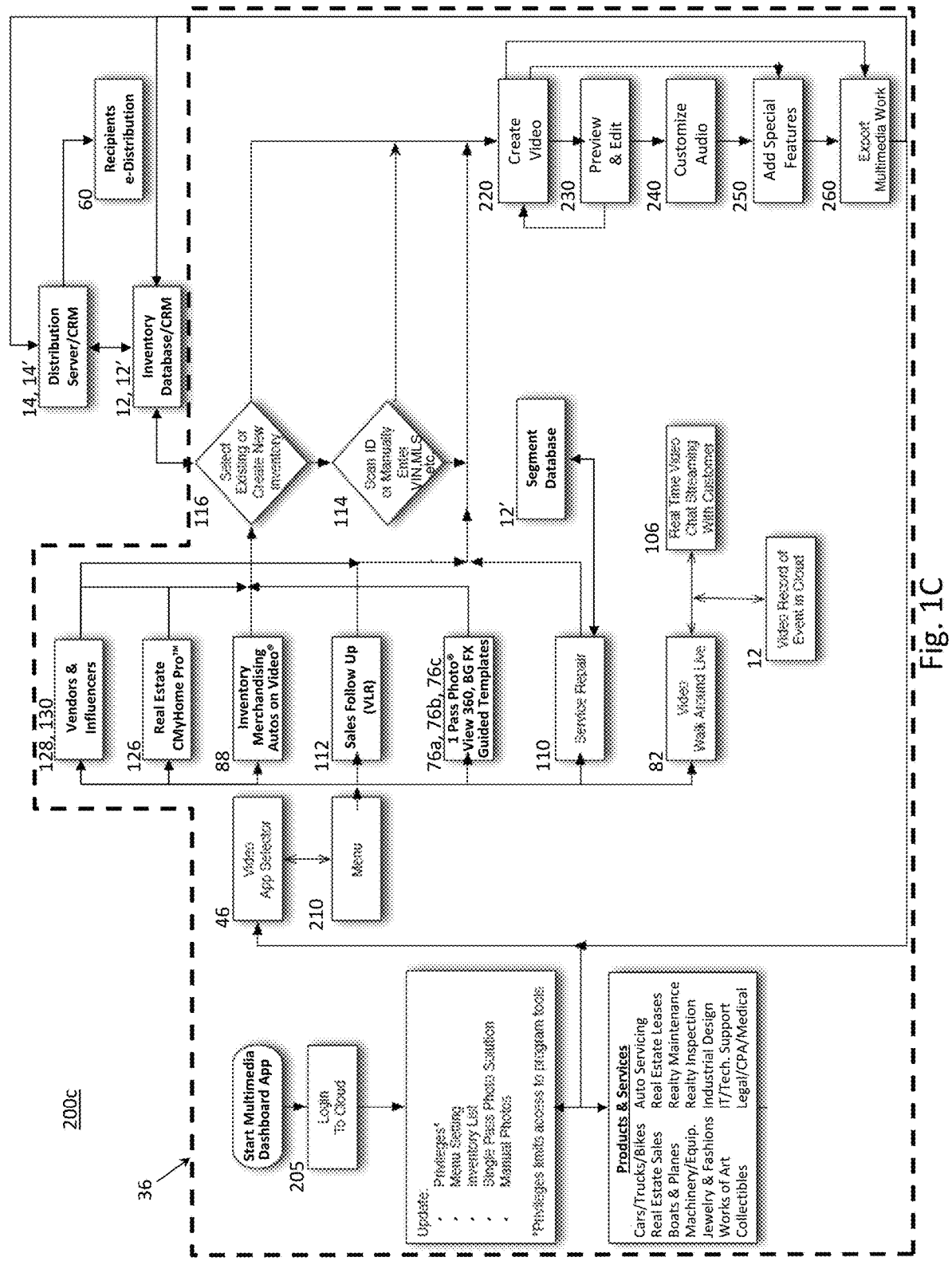

Generally, the system 10 described herein allows for the creation of multimedia segments 20, the production and management of multimedia sales promotions 100 using the multimedia segments, and the uploading and distribution of the multimedia sales segments and promotions related to an item in order to better market that item through one or more web-based media portals and/or direct electronic communications with customers, all of which is controlled through a single multimedia dashboard application 36 that operates on one or more computing devices 16, preferably a handheld computing device. The general processes 200 of the tools within the system 10 are illustrated in the flowcharts of FIGS. 1A-1C and are described in detail below. A schematic diagram of the general system 10 is shown in FIG. 2A, and particular innovative tools of the system are described below with reference to FIGS. 2B, 2C and 3-10.

Figure 2A:
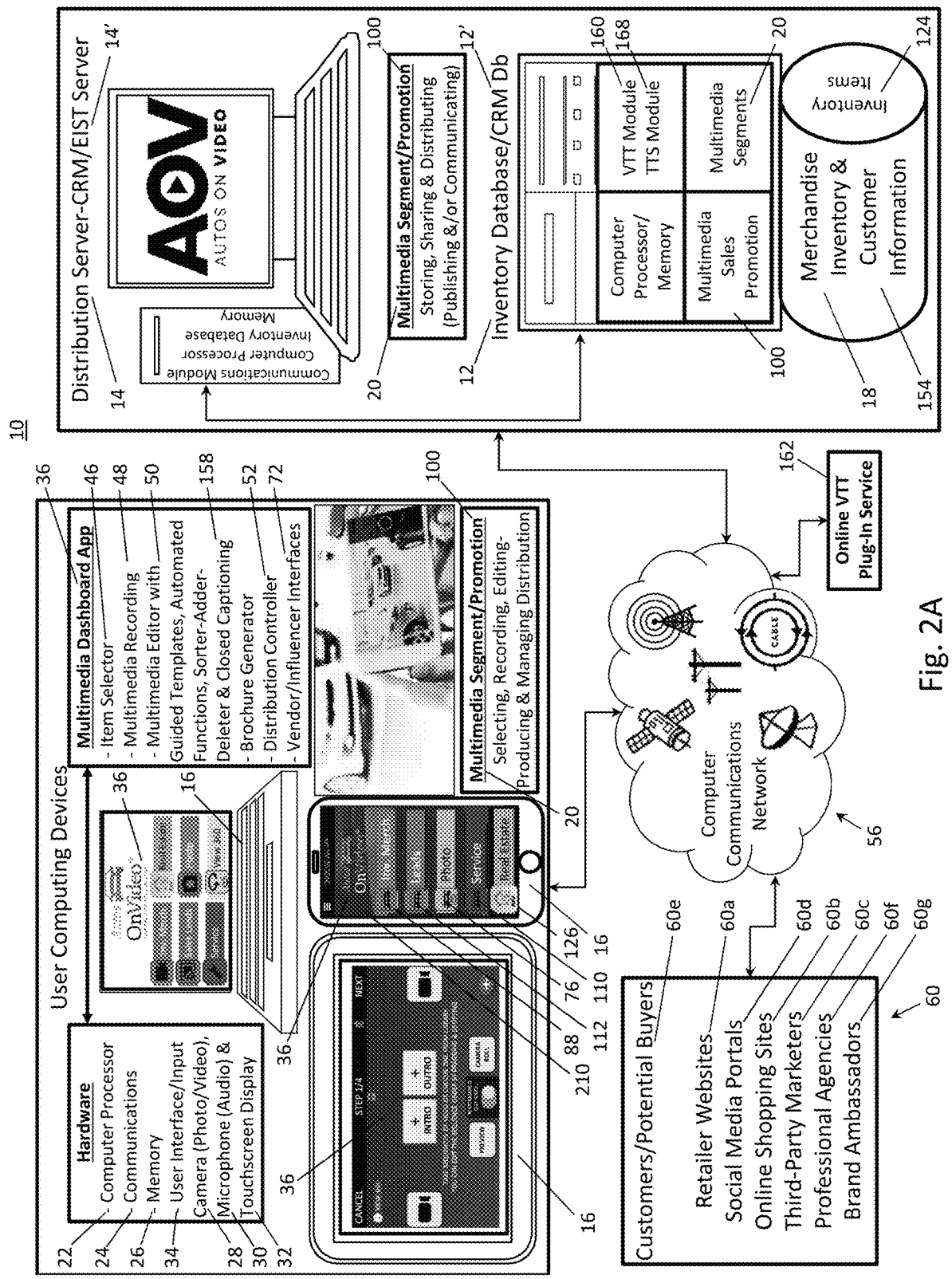
FIG. 2A is a schematic diagram of the present invention's system.

As shown in FIG. 2A, the system includes the inventory database 12, the distribution server 14, user computing devices 16, and the multimedia dashboard application 36 operating the computing devices that are in communication with the inventory database and the distribution server. The multimedia promotions are electronically distributed to individuals, marketing partners, web portals, and any other recipients 60, through a computer communications network 56 as specified by the user with distribution instructions 142. The promotions can be published on a web-based media portal, such as retailer's website(s) 60a, online shopping bazaars third-party marketing services 60c, and/or social media portals 60d or may be privately communicated to customers or potential buyers 60e, such as through email and other forms of direct electronic communications. As explained in detail below, as an end-to-end solution, the dashboard application 36 includes modules that are primarily used by representatives for the businesses 132 that are selling the goods and/or services and preferably also includes one or more modules with interfaces 72 that can be used by marketing partners 134. Examples of marketing partners include professional media studios and marketing and advertising agencies 60f as well as other third-party vendors, such as sponsors, endorsers, and/or social media influencers acting as brand ambassadors 60g, and the interfaces in the modules allow the marketing partners to directly interact with the businesses that they support so that they can upload the multimedia segments that they create through the dashboard application rather than through a different application as required by other software application marketing tools, such as Siddique's AFMS/VOS software identified in the Background section above and described in US Pat. App. Pub. No. 2010/0030578.

The multimedia dashboard application 36 includes item selectors 46, multimedia recording modules 48, multimedia editors 50, a brochure generator, and a distribution controller 52. The distribution controller preferably includes an export interface with at least one of the distribution server and the inventory database. With these tools combined together 54, the same multimedia dashboard application 36 is used to record multimedia segments and/or select segments to be uploaded to and/or downloaded from the inventory database as well as edit and combine the multimedia segments 20 to produce multimedia promotions 100, and control the distribution of the promotions, thereby providing users with a simplified and integrated system and process to market their goods. The multimedia dashboard application interacts with the input devices on the user computing device, including the camera 28, the microphone 30, and the interactive touchscreen 34 display 32 which allows the user to enter product information, record video of the product, extract still photos from the video and perform other editing functions to produce multimedia segments and the multimedia sales promotions, to upload the product information, the multimedia segments, and the multimedia promotions to the inventory database, and to control the distribution server.

The inventory database and distribution server make the multimedia sales promotions available to one or more web-based media portals that can be accessed by and displayed to a third-party consumer. The system also allows for the direct delivery of multimedia sales promotions or links to the promotions to individual customers through any channel of direct electronic communication, such as by email, text messaging with embedded shortened links (SMS), or multimedia messaging (MMS). Accordingly, as explained herein, the system simplifies the ability to market a product with multimedia materials, i.e. audiovisual media, directly to customers or through a posting on one or more web portals, such as a retailer's website, online shopping bazaars, social media sites, or web marketing sites, where the user can take video, record audio, and extract photos to upload or otherwise distribute the multimedia sales promotion to one or more web portals with a single computing device with one multimedia dashboard application. Additionally, the user can customize these multimedia sales promotions within the multimedia dashboard application.

The inventory database 12 contains a set of inventory items 124 in the sales inventory 18 for a retailer or other seller. For example, the inventory database for a car dealership includes data for the vehicles in the dealership's sales inventory. Although the data associated with each item may vary, the inventory database of the multimedia creation and management system described herein also includes one or more multimedia segments 20, such as videos and/or photos of the inventory items, and multimedia sales promotions 100 that have been saved to the inventory database. Multimedia generally refers to any type of audiovisual media which may include photos 38, videos 40, audio tracks 42, such as voiceovers, music, sound effects, and other soundtracks, as well as graphics and other images and other sounds which are saved in the inventory database as individual multimedia segments. In operation, the computing device 16 accesses the multimedia segments 20 stored in the inventory database through the computer communications network 56, or allows the user to create new multimedia segments, and runs the multimedia dashboard 36 to arrange, edit, and format the multimedia segments to the create multimedia sales promotions 100.

Many of the same tools and functionality in the multimedia dashboard application that are used to create the multimedia sales promotions can also be used to produce multimedia service proposals or reports on vehicles that are being maintained, repaired, or otherwise serviced. For example, when a vehicle is brought in for service, the user in the service department can take pictures or a video of the vehicle that show the service that is necessary. The inventory database can include contact information for the customers who own the vehicles being serviced, and the dashboard application and/or distribution server can send electronic message to the owner with the multimedia service report or a link to the report. The owner can respond back to the service department through the electronic communication or by placing a call. Accordingly, the multimedia sales promotions 100 produced by the multimedia dashboard application can also be multimedia service proposals for vehicles or any other type of service.

The computing device 16 is preferably a handheld device, such as a mobile smartphone or tablet computer, and the multimedia dashboard is a mobile application running on the device's computer processor. It will be appreciated that users can run the multimedia dashboard application on other computing devices, such as laptop computers and even desktop computers and tower computers. The multimedia dashboard application can be run locally, particularly tools that access the camera and microphone on the computing device, and can also run in a cloud computing environment. Regardless of the particular computing device being operated by the user, the user's computing device is in networked communication with the inventory database and the distribution server and includes a camera 28, a microphone 30, a user interface and data input device 34, a memory module 26, a communications module 24, a computer processor 22, and a display screen, preferably a touchscreen display 32 on a smart phone or tablet computer. The computer processor controls the other modules on the computing device and the user interface allows the user to view and select the described modules and applications within the multimedia dashboard application without adding or otherwise opening another application. Preferably, the display screen is an interactive display with touchscreen functionality that serves as the primary user interface for the application.

The multimedia dashboard application allows the user to create a multimedia sales promotion that is ultimately published on a retailer's website, online shopping bazaars, third-party marketing services, and/or social media portals or are otherwise communicated to customers or potential buyers. The user operates the multimedia dashboard through the user interface, entering inputs 44 through the user interface to access preexisting multimedia segments from the inventory database, control the camera to take new photos and videos, and control the microphone to record voiceovers, and upload the new multimedia segments to the inventory database. For computing devices that have a touchscreen, the user can enter information through a touchscreen keypad or can otherwise select items presented on the display. It will be appreciated that the computing device may have other user interfaces, such as a speech to text data entry mode of operation as well as a physical keyboard or mouse or any other peripheral device that is operable with the computing device through a wired or wireless communication connection.

To create the multimedia sales promotion, the user operates the media editor on the multimedia dashboard to customize the multimedia segments associated with the items in the inventory database. The multimedia editor is made up of a video editor, photo editor and sound editor that the user interacts with through the user interface. In operation, the communications module 24 accesses the multimedia segments and the multimedia sales promotion, if one has been previously created, stored in the inventory database. The user computing device has an operable communication link to the inventory database which allows the user to operate the item selector to select a particular item from the inventory that will be the subject of the multimedia sales promotion. Depending on the type of product being offered, the user may enter in the stock keeping unit (SKU), vehicle identification number (VIN), hull identification number (HIN), tail number, multiple listing service (MLS) number, model or serial number (SN), name or other identification code related to the particular item and subsequently select that item within the inventory database.

Once the existing multimedia segments are accessed through the user computing device, the user can operate the multimedia dashboard application to format, edit and customize the segments into customized multimedia portions associated with the item. For example, a user can take multiple still shots of the front of a vehicle and combine them with other still shots of the rear of the vehicle and combine them into a customized portion. Customized portions can be further edited and combined to create the completed multimedia sales promotion.

In addition to accessing the inventory database to edit preexisting multimedia segments for use in creating the promotional multimedia, the multimedia dashboard application running on the computing device operates the camera and microphone to record new photos, videos and audio tracks. As with the preexisting multimedia segments 20 in the inventory database, new multimedia segments 20 can also be created, selected, and edited and arranged into custom portions and may be combined with or completely replace the preexisting segments previously saved in the inventory database. For example, if a user accesses a preexisting photo segment but determines the photo is outdated, the user may use the camera through the multimedia dashboard application to capture a new photo that can be uploaded to the inventory database so it can be used in the multimedia promotion. Accordingly, the user can save the new photo in the inventory database while operating on the photo in the processor and memory module of the computing device using the multimedia dashboard, without having to leave the multimedia dashboard application.

As indicated above, the system is described according to its use in selling vehicles, but the present invention is not limited to selling cars and may be used for selling a wide variety of products. In certain embodiments, the present invention may begin with either a private seller or a dealer logging into the software through the user interface of the computing device. The dealer may upload or update their inventory in the inventory database. When selling a car, the private seller may scan a Vehicle Identification Number (VIN) or manually enter the VIN into the program. The program may acquire the VIN, and decode the VIN by accessing a cloud database for decoding. The information of the car may thereby be transferred back to the private seller's computing device from the inventory database. Once the proper item has been identified either from a dealer or private individual, the multidimensional sales promotion may be created within the multimedia dashboard software application based on the preexisting data in the inventory database and any new multimedia segments that the user creates and uploads using the multimedia dashboard.

FIGS. 1A, 1B, and 1C show flow charts of the system's processes 200 according to various embodiments of the present invention. FIG. 1A generally illustrates the system process 200*a* in which multiple members of a sales staff as well as private individuals, small retailers, and marketing partners use the multimedia dashboard application to produce, share, and distribute multimedia segments and multimedia sales promotions through a database that stores the multimedia segments and multimedia sales promotions and communicates the multimedia sales promotions to various web-based sales portals. FIG. 1B generally illustrates the system process 200*b* in which the user of the multimedia dashboard application are also able to edit multimedia segments with additional audio options and also have the option for distributing the multimedia sales promotions through direct electronic communications with potential customers as well as through the web-based sales portals. FIG. 1C generally illustrates the particular system processes 200c of the modules in the multimedia dashboard application 36 along with the inventory database 12 and the distribution server 14 that are in communication with the application.

In operating the multimedia dashboard application 36, a member of the sales staff or the service team for a car dealership preferably logs into the system 205 through the multimedia dashboard application as an authorized user. In the top-level menu 210 of the multimedia dashboard application, the authorized user can select the particular module for their particular purpose, including the inventory merchandising module 88, the sales leads module 112, one or more specialty photo modules 76a, 76b, 76c the maintenance and repair service module 110, the walk-around live module 82, the real estate module 126, and the vendor and influencers modules 128. Each of these dashboard modules uses the integrated tools and functionality of the multimedia dashboard application to create multimedia segments 220, edit and preview the multimedia segments 230, customize audio on the multimedia segments 240, add special tools 250 such as graphic overlays, and export multimedia segments and multimedia sales promotions 260 as described above and according to the processes described herein. Generally, the multimedia dashboard application operatively communicates with the inventory database through the communications module, and the user combines and edits multimedia segments created on the user's computing device and stored in the inventory database to form the multimedia promotion. In particular, the user operates the multimedia dashboard application to add, edit, delete, and/or sort the multimedia segments as explained herein and to update the multimedia segments and multimedia promotions saved within and shared through the inventory database.

It will be appreciated that users will subscribe to those software modules in the multimedia dashboard application 36 that match their business needs. For example, an automobile dealership will likely select the Autos on Video® inventory merchandising module 88 along with the sales leads module 112 and may also want the maintenance and repair service module 110 and the specialty photo module(s) 76 and possibly the walk around live module 82 and the vendor and influencer modules 128, 130. Similarly, a real estate brokerage may only want the real estate module 126 and the sales leads module 112 and may work with a marketing company that has the vendor module 128. For example, as explained in detail below, an advertising agency that has subscribed to the vendor module 128 could use the multimedia dashboard application 36 to work with a number of businesses that have one or more modules and an inventory database. Once the dashboard selection is made, the user can select an existing item from the corresponding inventory database by entering in VIN, SKU, HIN, SN, MLS or tail number 116 or other product identifier or can enter in a new item 114 that is not previously saved in the inventory database.

As evident from FIG. 1C, each one of the operating modules 88, 112, 110, 76, 82, 128, 130 in the multimedia dashboard application uses the common tools and functionality described above 220, 230, 240, 250, 260. All of the modules allow the users to create new multimedia segments which are preferably saved in a shared database, such as the inventory database 12. The inventory database preferably is used for storing the multimedia segments and multimedia sales promotions that are used for each one of the modules. It will also be appreciated that another shared cloud-based database 12', different from the inventory database, could be used for multimedia segments that are created or edited with the maintenance and repair servicing module. Additionally, it will be appreciated that the multimedia dashboard application of the present invention can be integrated with different types of existing management tools that have their own inventory database 12' and distribution server 14' solutions, such as existing customer relationship management (CRM) systems for products and electronic inspection and scheduling tools (EIST) for services. When the multimedia dashboard application is integrated with a CRM system, EIST, or other business software tool that can be running on a server system platform, the customer information 154 available through the application could be more than the customers' names and contact information; the information could include past purchases, individual needs and preferences, credit reports, social media metrics, etc. Most of the modules also preferably allow the users to retrieve the previously created multimedia segments and multimedia sales promotions that are stored in the inventory database. In the export of the multimedia sales promotions or other multimedia segments, the multimedia dashboard application uses its communications module to electronically distribute the multimedia files and/or shortened URL links to the multimedia files. The files are communicated over the computer communications network to the user-specified recipients 60, and a copy is saved in the inventory database. When the multimedia dashboard application has completed the export step, the user is again presented with the top-level menu 210 so that the user can start the same process for another item or can choose one of the other modules.

In one aspect of the inventive system, the multimedia dashboard application uses one or more base videos 62 to create a custom multimedia body portion. Within the multimedia dashboard application, the video can be edited to include photos, music, voiceovers, and other custom audio. In another aspect of the inventive system, the multimedia dashboard application is used to bookend an intro portion 64 and/or an outro portion 66. The multimedia dashboard application can also be used to preview and edit 220 the multimedia segments and export the completed multimedia sales promotion to the camera roll, inventory database and/or distribution server. Due to the nature of livestreaming interactive multimedia, the livestreaming module, such as the video walk around live 82, preferably bypasses the editing and customization functions to proceed from the recording function immediately to the distribution function according to the livestream functionality as described below.

The multimedia dashboard preferably includes guided templates that automatically generate predefined product views. For example, as described with reference to FIGS. 3C-3F users can produce customized multimedia promotions by recording their own intro and an outro multimedia segments that can be combined with a body segment, and they can also record their own voiceovers for one or more of the segments and select the background music. The multimedia dashboard application includes an intro-outro guide tool that users can follow to record the intro segment and the outro segment and add the segments to a body segment to produce a customized multimedia promotion. As another example, as described below with reference to FIGS. 4-7, a user can use the View 360 tool 76a to take a video around the exterior perimeter of the product and either the user or the system selects image frames from the video to automatically create a rotatable 360° view of the product's exterior. Additionally, silhouette images guide users on the photographs to take and the order of publication of product features with the option of graphic overlays as described below with reference to FIG. 8, and users are also provided with audio guides as described below with reference to FIG. 9.

In addition to the templates and automated functionality summarized above, the View 360 tool also provides users with a hotspot overlay 78 function that provides still frame templates 80 with the descriptive names of product features and exemplary silhouette images that guide the user to take pictures of the particular features. When the user selects particular photos for corresponding hotspot locations on the product, the View 360 tool automatically tags these product features with representative icons, graphical symbols, text descriptions, or other feature identifiers 104 for the features on the corresponding views in the pictures that form the rotatable 360° view and also links the particular pictures of these product features to the tagged features 78a so that when a potential customer selects the icon, the picture of the corresponding product feature is displayed. It will be appreciated that providing guide tools and automating functions in producing and distributing the multimedia promotions simplifies the overall operation of the system so that members of the sales staff or support staff of a car dealership can create and manage their own multimedia promotions without having to hire specialists in videography, photography, editing, and post-production distribution.

The schematic diagram of the inventive system is shown in FIG. 2A, including the inventory database, the distribution server and examples of remotely operated user computing devices. The computing device has a display screen that presents the user with an interface to view the multimedia dashboard application. Preferably, the display screen is interactive with touchscreen functionality that can receive inputs from the user. In the preferred embodiment, the multimedia dashboard application is downloaded to the user computing device 16 and is resident in its memory 26 and runs on its processor 22. In other embodiments, the multimedia dashboard application is hosted and runs within a cloud computing environment and is accessed by the user computing device through a web browser application that is directed to a website with a particular URL that can permit access to the web-based software. As a resident software application, the multimedia dashboard can access the media segments that are saved to the computing device's memory storage or that are available through networked communications with the inventory database. As a hosted software application, the multimedia dashboard preferably accesses the media segments through the cloud computing environment, such as through URL identifiers which specifies particular segments in the inventory database. It will be appreciated that in a cloud computing environment, the URL identifiers for the media segments in the inventory database do not necessarily need to be the same as the website URL associated with the software. For a private seller, the user may login to an online shopping bazaar and transfer the complete listing package from the device to the online sales portal. For a dealer, the video, audio and images may be automatically uploaded to a media portal for the dealer, which transfers the complete multimedia sales promotion listing package from the multimedia dashboard to the online sales portal.

As indicated above, the same multimedia dashboard application is used to record multimedia segments, select segments to be uploaded to and downloaded from the inventory database, edit segments to produce multimedia promotions, and control the distribution of the promotions. This fully integrated dashboard application, such as the Autos On Video® software suite, provides users with an end-to-end solution for creating, managing, and distributing multimedia promotions. Users can shoot video with the multimedia dashboard application that is loaded on the computing device or that is accessed on a hosted platform through a web browser. Accordingly, the user may record video and capture still images within the dashboard application, either directly or by extraction from video, and also use the dashboard application's media editor to produce the multimedia sales promotion. The user can upload and download multimedia segments and multimedia sales promotions between the computing device and the inventory database and can select one or multiple web portals or individuals to which the distribution server sends the multimedia promotions.

The media editor includes a photo editor, a video editor, and an audio editor that edits photos, videos, and audio tracks based on user inputs. The photo editor allows the user to edit a collection of photos for an item in the inventory database or to edit new photos captured by the camera and saved locally on the computing device. The media editor 50 can sort 70a media segments in a collection, add media segments to the collection, delete media segments from the collection, or edit individual media segments based on the user inputs and whether automatic editing is enabled by the user, for example when they do not wish to manually edit a media segment. The photo editor may involve cropping, altering the exposure, altering the balance, adding a marque or making other changes and can be done on the user interface where a photo icon and a sorting icon are displayed. Similarly, the video editor can modify videos based on user inputs such as cropping, adding a marque, adding wipes, adding or deleting footage, adding written captions, etc. The audio editor can add audio recordings to a video, such as voiceovers 68 and/or background music 74, or can silence the video or use the ambient sound that had been recorded with contemporaneously with the video. Generally, the media editor allows the user to edit and combine 70b the multimedia segments to create the multimedia promotion, such as a guided video tour of a product or a service, a customized video of a product with unique intro and outro, a sequence of photos for a product, a rotatable 360° view of a product, and hotspot overlays for particular product features.

An inventive aspect of the present invention includes an automated closed captioning tool 158 with a single-instruction operation from the computing device in a client system environment with the server system, such as the CRM, EIST, or some other enterprise software system as explained above. As shown in FIG. 2A, the server system creates the vtt-format file by a voice-to-text transcription software module that is either a VTT module 160 in the server or is accessed through an online VTT plug-in service 162, such as the Amazon Web Services (AWS) vtt generator. Regardless of which computer system performs the transcription, the text in the vtt-format file is synchronized with the video. With the online VTT plug-in service, the audio-video file is uploaded where the voice-to-text (or speech-to-text) transcription software module creates the vtt-format file and merges the vtt-format file with the audio-visual file into the merged audio-visual-vtt file which is downloaded to the server system.

Figure 2B:
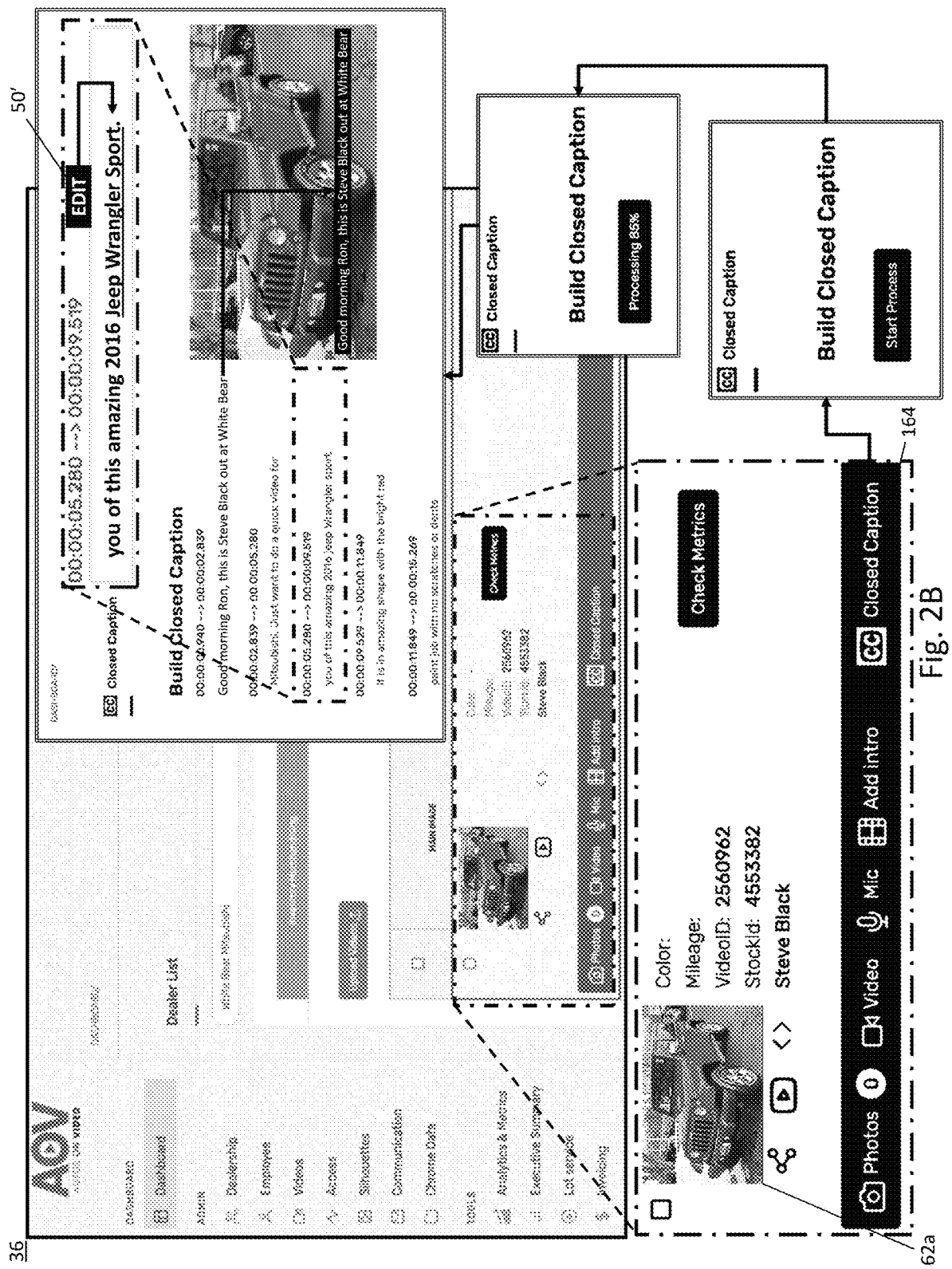
FIG. 2B is a screenshot of the full-screen multimedia dashboard with a detail view of the closed captioning tool.

As shown in FIG. 2B, the multimedia dashboard application displays an image on the computing device's display screen which is linked to an audio-visual file. The image can be a text block identifying the audio-visual file, such as a file name or a description, an icon of the audio-visual file, and/or a video frame from the audio-visual file. Simultaneously, a selection option for modifying the audio-visual file with closed captioning is displayed on the display screen as a button, hyperlink, or some other image 164 with the audio-visual image. When the user chooses the selection option through the user interface, the multimedia dashboard application launches the closed caption function, such as by sending a closed caption creation instruction through the communications module to the server system. Upon receiving the closed caption creation instruction, the server system creates the vtt-format file with a set of closed captions corresponding with the audio-visual file and merges the vtt-format file with the audio-visual file into a merged audio-visual-vtt file without further instruction from the computing device.

As shown in the detail view of FIG. 2B, the closed caption text can be edited using the text editor 50' that can be a part of the multimedia editor 50 in the in the multimedia dashboard application. A text display from the set of closed captions is preferably shown in the display screen along with a corresponding video frame from the audio-visual file. When the merged audio-visual-vtt file is created, the user can select the text editor option to edit the text associated with the corresponding video frame. Similarly, the user can entering a set of edit instructions through the user interface to modify the text in the set of closed captions corresponding with a sequence of video frames. The final edited version of the merged audio-visual-vtt file can be saved to an inventory database and distributed through the distribution server according to a set of instructions entered into the multimedia dashboard application and executed by the multimedia sales promotion system.

Figure 2C:
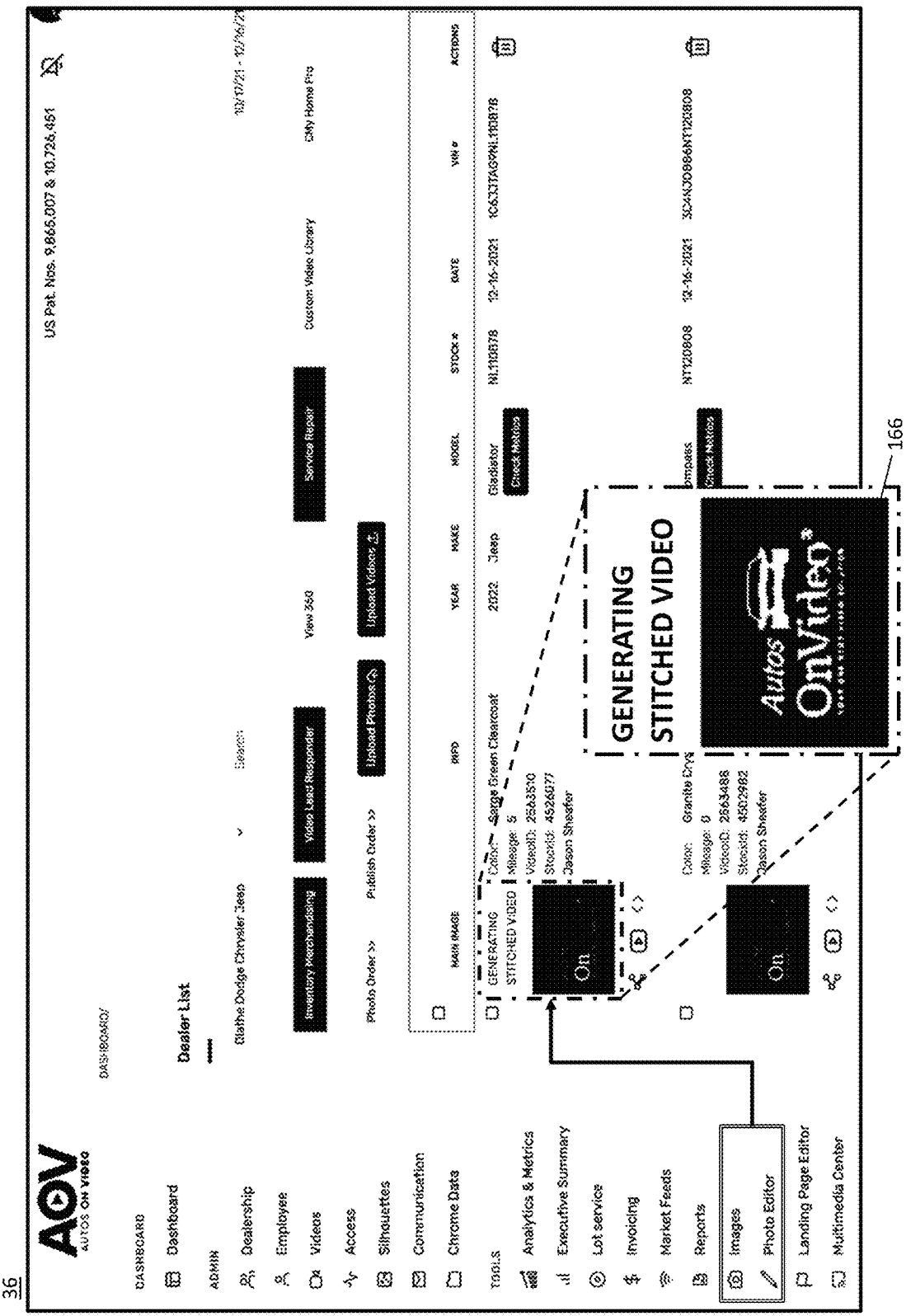
Figure 2D:
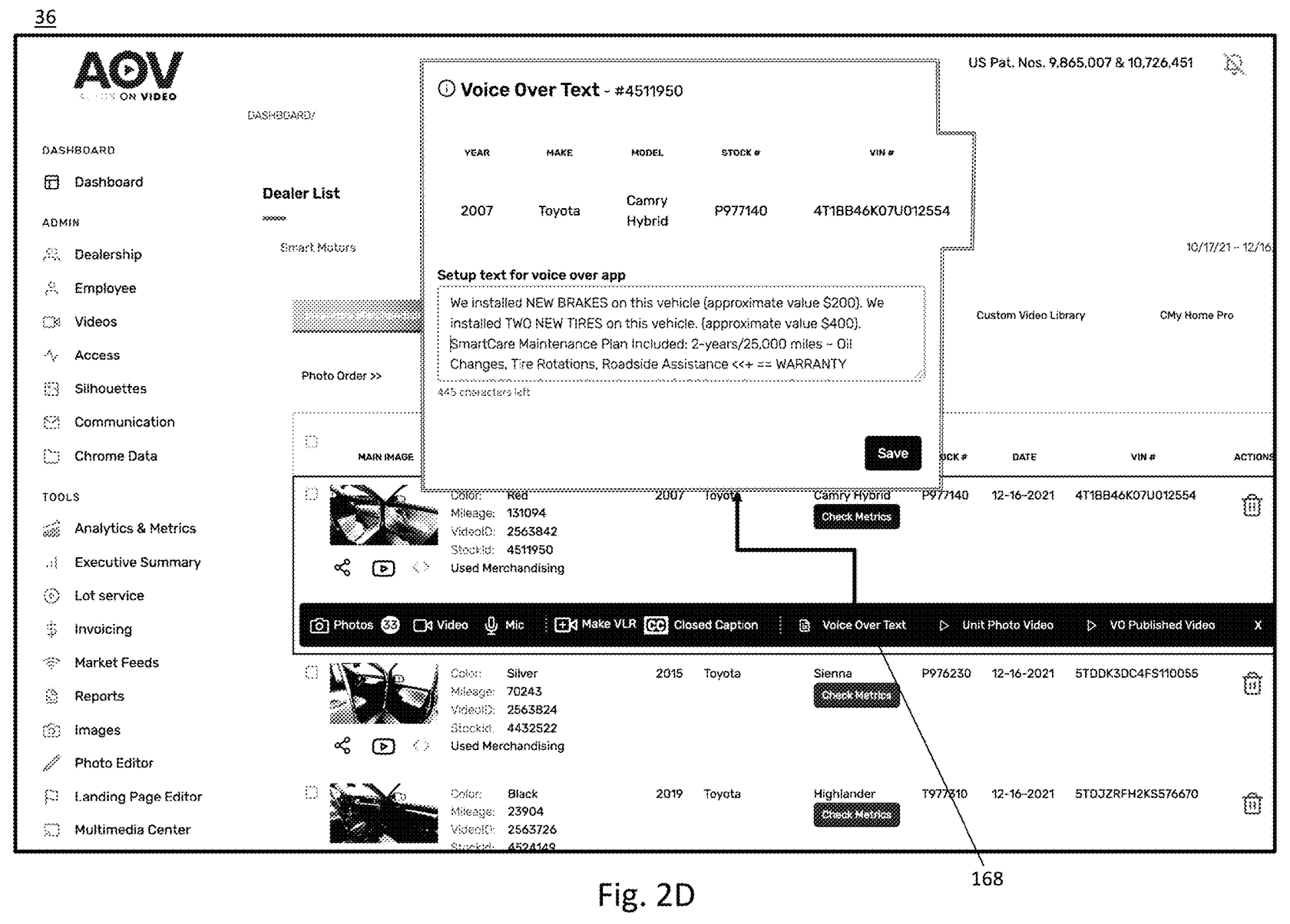

As shown in FIG. 2C, a stitched photograph tool 166 can be combined with a text-to-speech (TTS) reader module 168 to create a stitched audio-video file with an automated voiceover that uses the text-to-speech soundtrack. The "artificial intelligence" (AI) voiceover can use the vehicle description's text file from the inventory provider or may use a customized text. The AI voiceover would preferably follow the text according to the publish order as compared with the "photo order" which is the raw entry of the photographs according to the most efficient way to walk around and photograph the vehicle. The description can be in any number of formats, such as a csv file, a text file, or a database file. It will be appreciated that the voiceover does not necessarily need to be synchronized with the video, but with a csv file, the video could be more easily synchronized with the text-to-speech voiceover.

As shown in FIG. 3, the user operates the camera and the microphone through the user interface on the multimedia dashboard to record the multimedia segments and operates the editing module to perform a series of steps that create a complete multimedia sales promotion. As shown in FIG. 3A, a particular user can log into the multimedia system with their unique ID or a new user ID can be created for a group of users that share the same inventory database for their multimedia sales promotions and may even share the same tablet computer to record videos and take pictures, such as may occur in a car dealership with several sales staff. As shown in FIG. 3B, the user selects 44a the action to be taken for a particular product, such as creating new photos or video, using or editing existing videos or photos saved on the computing device or within the inventory system, or editing detail information about the product.

Once the multimedia segments associated with the selected item are downloaded from the inventory database, the user can format the existing multimedia segments into the body portion of the multimedia sales promotion as well as record and add customized intro and an outro video portions as shown in FIG. 3C. When the user selects the intro or outro button, a pop-up window or menu can be displayed with optional selections that the user can choose to add the corresponding intro or outro video, such as a selfie video, a video from an inventory video library, a default video, or a video from a custom video library as described below. Similarly, when the user selects the plus-sign item selector, a pop-up window or menu can be displayed with additional optional selections that the user can choose for the source of the additional video, such as from the inventory video library or from the custom video library. Additionally, the user can record audio, such as with voiceovers, or select background music for the video segments, or take new pictures to be used within the multimedia sales promotion. Although the user has the option to manually edit the multimedia sequences, the user may elect to skip the customized formatting of the intro, body and outro portions and move directly to the creation of the promotional materials.

FIG. 3D shows an example in which a user has customized a promotional video with an intro video that is merged with the main video body and concludes with a standardized outro. FIG. 3E shows multiple body videos which can be combined with an intro video and an outro video as well as photos and audio tracks. Additionally, the user can add unique and stylized transitions like fading and customized audio as explained below, and when the multimedia promotion is ready to be exported, the distribution controller 52 provides the user with various electronic communication options 144. When the user selects the export function 260, such as with a button, hyperlink, or other selection option, a pop-up window or menu can be displayed which allows the user to select the distribution instructions 142 from several options such as email (plain text or html format), text/SMS, direct messaging (DM), or any other electronic communication methodology to communicate servicing information to customers, including postings to one or more websites. The distribution options are particularly shown in FIG. 3F and also include the options to either send the video to the dashboard or sending the video to the video library. Accordingly, the user can select or create multimedia segments and build a complete promotion within the multimedia dashboard application and without using any other software application.

As indicated above, the multimedia dashboard includes guided templates and automatically generated predefined product views. Automatic creation of predefined views allows the user to skip directly to the arranged photos and video used as the body portion of the promotional multimedia as well as export the completed multimedia sales promotions to the inventory database or third party site. By automating aspects of the creation of the multimedia sales promotion materials, the user can merchandise more items in a shorter amount of time where they do not have to manually edit and format each multimedia segment into a multimedia sales promotion where it is completed for them. Additionally, by providing guided templates within the dashboard application, the system can be operated by sales staff or support staff to produce multimedia promotions without any specialized training in multimedia creation or production.

The View 360 tool as shown in FIGS. 4-7 uses both guided templates and automatic actions performed by the multimedia dashboard application to create a rotatable 360° view of the product as another option for a multimedia sales promotion. When preparing a View 360 promotion for a vehicle, the dashboard application guides the user in the proper operation of the recording module 90 to capture the interior and/or exterior 360° views of the vehicle either through multiple sequential photographs, one or more sequential videos 94 or a 360° lens which are then saved in the memory of the handheld device. The dashboard application can automatically select image frames 98 from the video and guides the user to select the image frames using the 360° multimedia template guide 92. In the preferred embodiment, external video segments of a vehicle are captured using the recording module, and the multimedia editor selects the image frames and automatically creates a rotatable 360° view of the vehicle's exterior. The user uploads the 360° view to the inventory database and links the view to the inventory record for the vehicle.

It will be appreciated that it is known to create a rotatable 360° view around the exterior of a vehicle with multiple individual photographs that are either taken from a series of particular vantage points around the vehicle or from a set vantage point while the vehicle is rotated on a large turntable. There are automated processes to combine the pictures together to produce the rotatable view. However, the turntable option is cost prohibitive for most car dealerships, and the "walk around" methodology is challenging to get the proper angles and distance at each particular vantage point so that the perspective of the vehicle is consistent through the sequence of images. When taking individual photos, if some photos in a sequence are taken close to the vehicle while other photos in intermixed within the sequence are taken further away from the vehicle, when the photos are combined into the rotating 360° view, the perspective of the vehicle between the images will change and cause a disjointed rotating view. Current solutions that suggest using a stand-alone application with a single video rather than an integrated end-to-end solution with distribution control and sharing of multimedia promotions series of still photographs; the stand-alone application is less efficient than the integrated solution of the present invention and requires additional time to distribute and share the rotating 360° view, and a single video may result in a single discontinuity between the first extracted image frame at the beginning of the video recording and the las extracted image frame at the end of the video recording.

The present invention avoids the problems of piecing together separate individual photographs and instead uses images taken from a sequence of videos of the vehicle to create the rotatable 360° view of the vehicle's exterior. Using the View 360 tool 76a, a user can take a video around the exterior perimeter of the product, and the system selects image frames from the video to automatically create a rotatable 360° view of the product's exterior. In the preferred embodiment, the dashboard prompts the user to select optional video sequences, such as a single pass 1-sequence video, a 2-sequence video, or a 4-sequence video as shown in FIG. 4A. Users who select the 2-sequence option are prompted to take a video on each side of the car, as shown in FIGS. 5A and 5B. Users who select the 4-sequence option will be prompted to take four videos on the respective segments of the car as shown in FIGS. 6A-6D. Users who select the single pass 1-sequence option can take a single video around the entire vehicle. After the videos are taken, the user confirms that the process had been followed for the 360 Video as shown in FIG. 7A, and the system then extracts a sequence of the images from the video and combines the sequential images into the rotating 360° view.

Figure 7D:
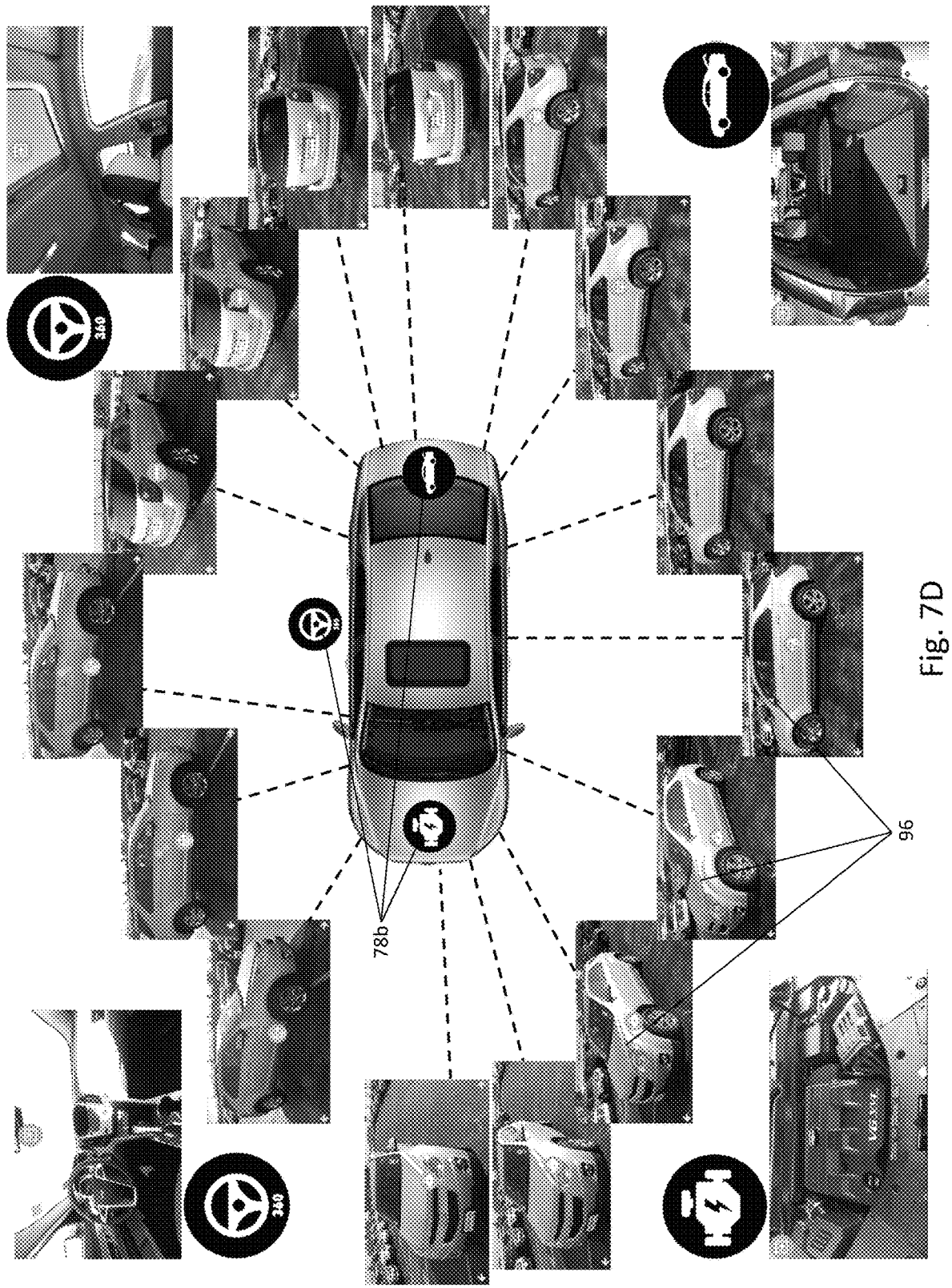
FIG. 7D is a schematic view of image frames selected from video sequences and representative hotspot overlays according to the multimedia dashboard View 360 tool.

As shown in FIGS. 7B and 7C, the multimedia dashboard application also provides the user with a hotspot template guide to create hotspot overlays that the system automatically integrates into the multimedia sales promotion. The hotspot template guide includes still frame templates with the descriptive names of product features and exemplary silhouette images that show the user the particular features that should be photographed. For example, as particularly illustrated in FIG. 7B for a vehicle, some of the hotspot views may be the tires, the trunk, the engine, the dashboard instruments, the transmission shifter, and the interior compartment. When the user selects particular photos for corresponding hotspot locations on the product, the View 360 tool automatically tags these product features with the feature identifiers on the corresponding views in the pictures that form the rotatable 360° view and also links the particular pictures of these product features to the tagged features 78a so that when a potential customer selects the icon, the picture of the corresponding product feature is displayed. It will be appreciated that providing guide tools and automating functions in producing and distributing the multimedia promotions simplifies the overall operation of the system so that members of the sales staff or support staff of a car dealership can create and manage their own multimedia promotions without having to hire specialists in videography, photography, editing, and post-production distribution. As particularly represented by FIG. 7C, a hotspot overlay of the interior compartment 122 can be another rotatable 360° view. According to the alternative embodiments shown in FIG. 7C, the user may select a 360° photo that has already been taken and is stored in the smartphone's images or may take the 360° image and directly import it into the mobile app without first storing it in the smartphone's stored images. An example of this latter approach is provided by incorporating a 360° image API into the mobile app's software, such as the Ricoh 360 API. In FIG. 7D, a schematic view of the sequence of vehicle images that comprise the rotatable 360° view 96 is shown with tagged features that are shown as hotspot overlays 78b for the engine, trunk, and interior compartment. The hotspots may also be linked to a voiceover recording with information relating to the hotspot.

Figure 8A:
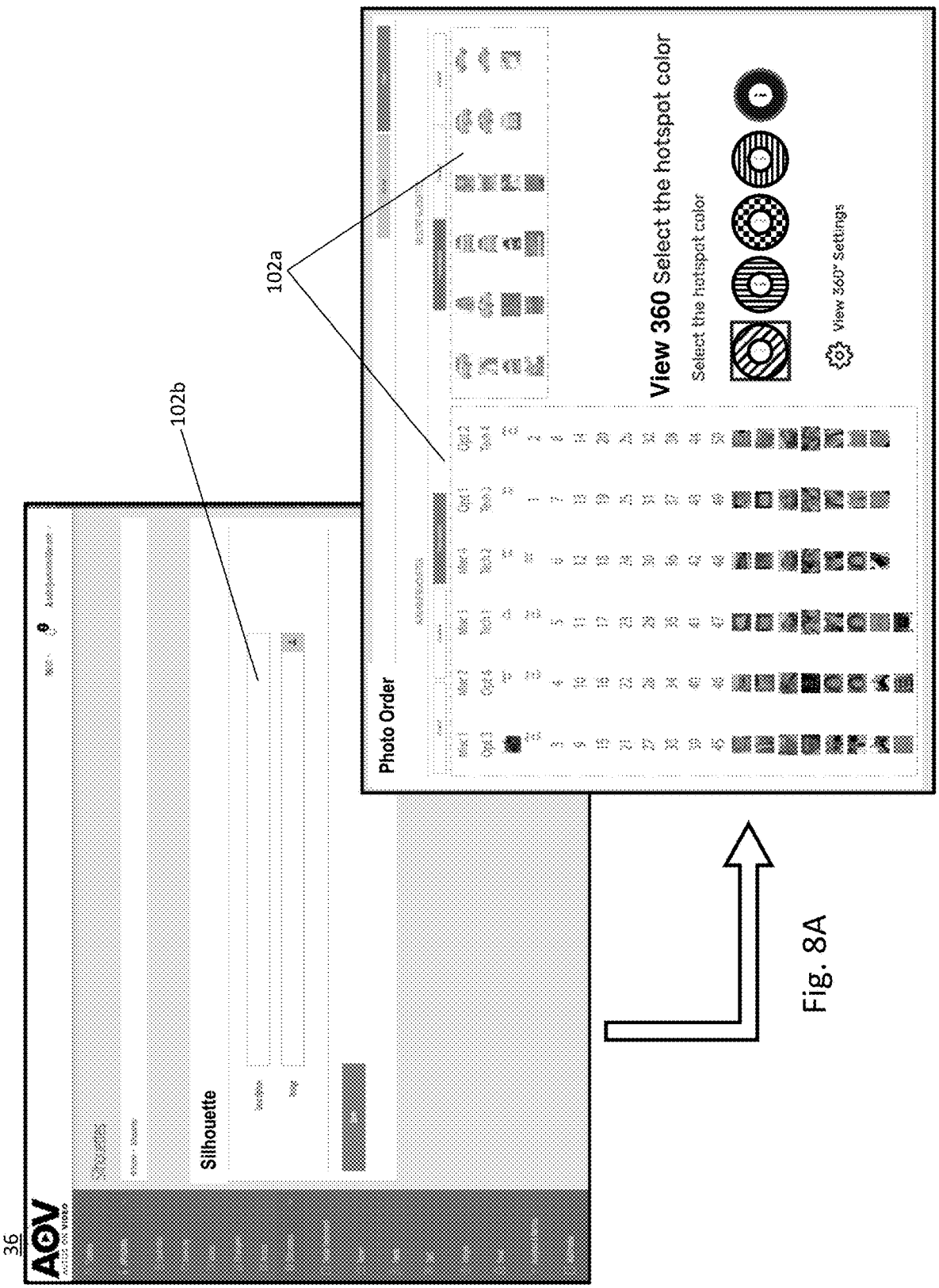
FIGS. 8A, 8B, and 8C are screenshots of the full-screen multimedia dashboard silhouette screen with the photo order prompt, arrangement and export screens.
Figure 8B:
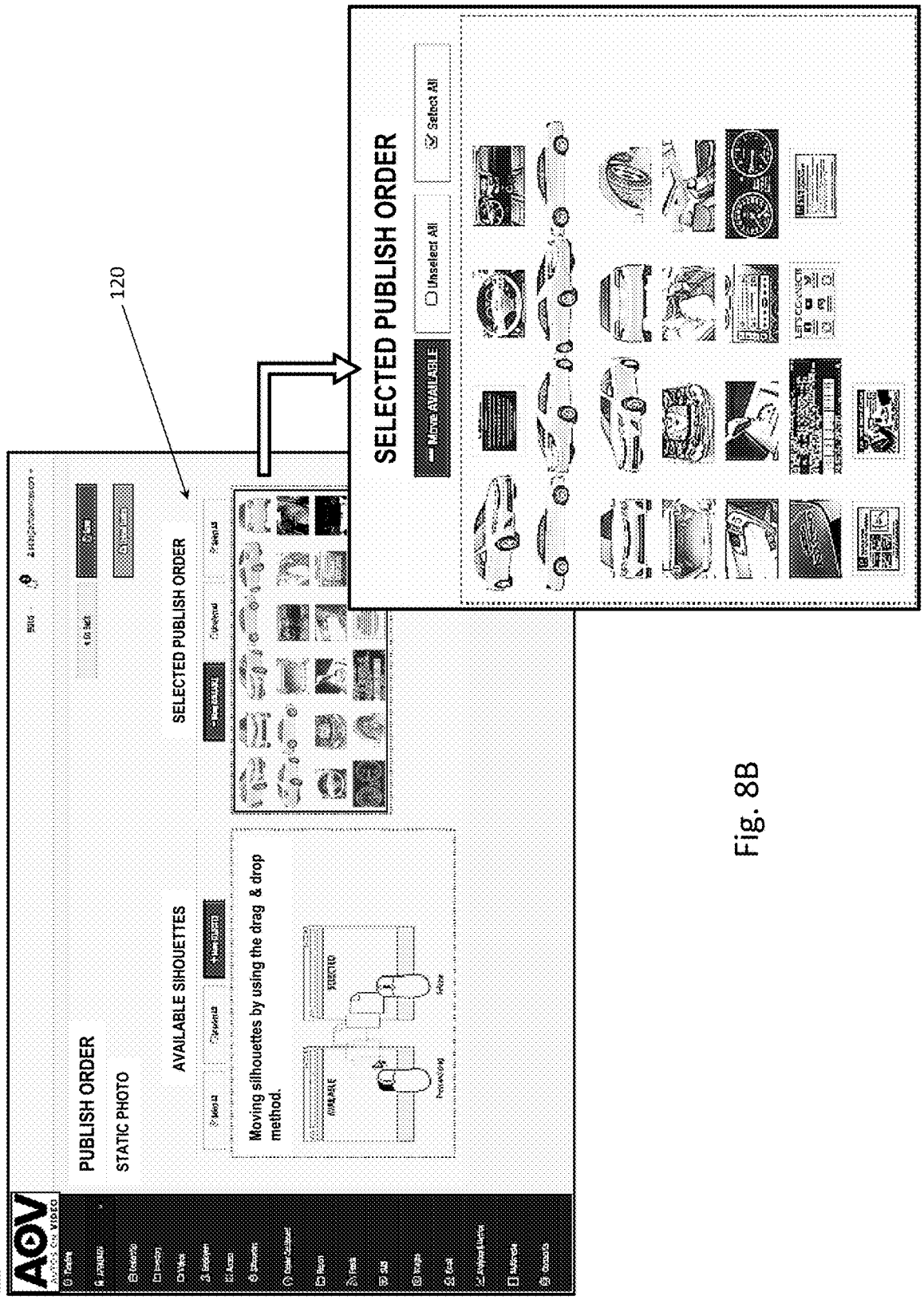

There are additional tools for editing, arranging, and producing the multimedia promotions in the various modules, including the modules identified above and the 1Pass-Photo® photograph creation and editing module 76b. As shown in FIG. 8, the multimedia dashboard application includes a template of silhouette images for various product features that should be photographed for a particular type of product, such as a vehicle. The silhouettes guide the user to record the preferred images for the product features and provides the user a particular order for the features which reduces the time it takes users to produce the multimedia promotion with the sequence of images. The template can be standardized for a particular retailer to provide a uniform presentation of images for the products. FIG. 8A depicts the user prompt for creating silhouette images 102a where the user can enter in a description of the image 102b to be taken for future use. Preferably, the administrative user can also select the hotspot color for tagging particular features in the rotatable 360° view. The system could also provide all users that have editing authorization to option to select the various colors that they want to use for tagging features in the rotatable 360° view. Subsequently, the system queues the entered silhouettes as shown in the photo order window where the user can select one or more silhouette images and rearrange the publication order 120 as they see fit as shown in FIG. 8B.

Figure 8C:
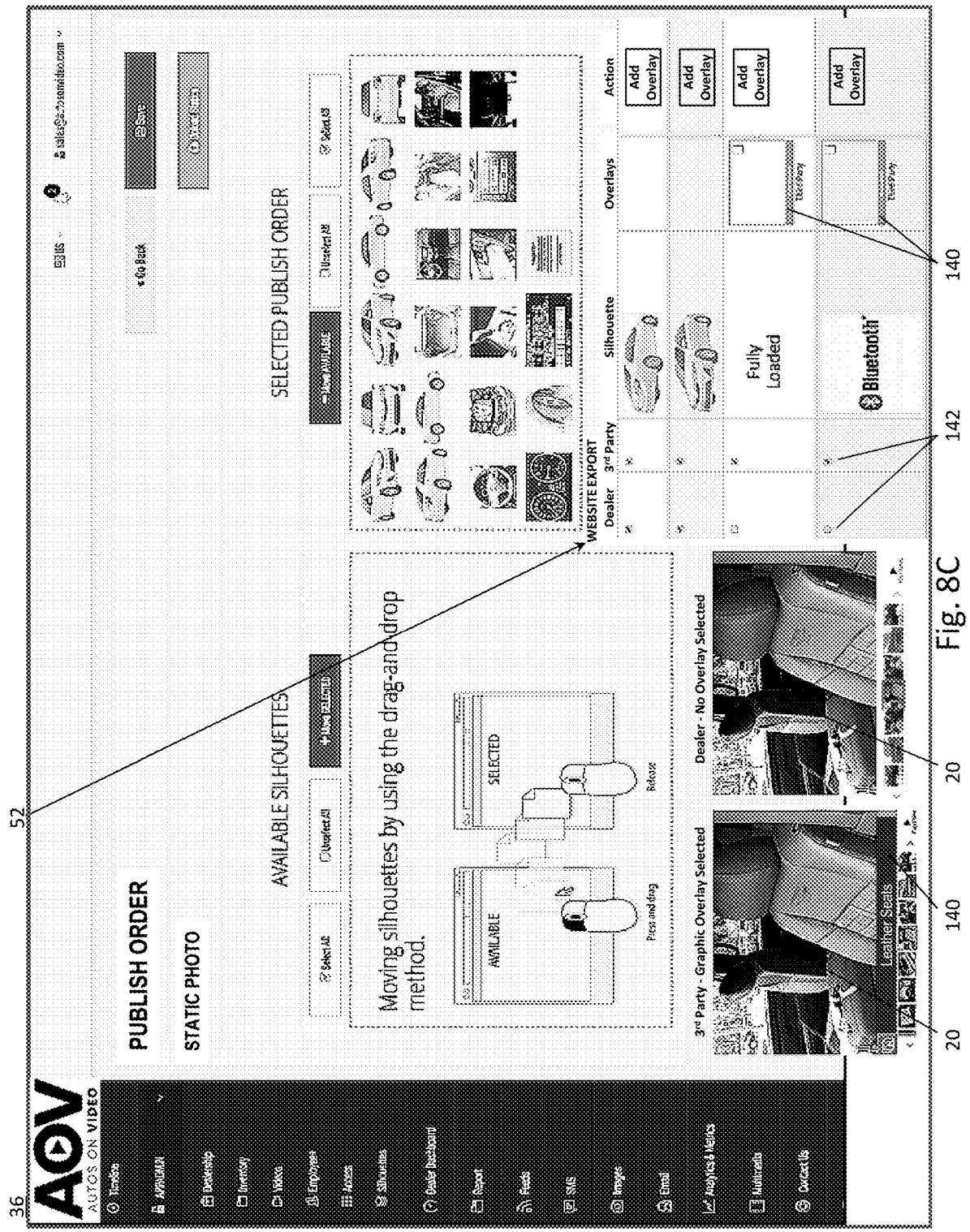

As indicated above, the distribution server can publish the multimedia sales promotion on the retailer's website as well as online shopping bazaars. Many times, shopping websites for automobiles, such as cars.com and autotrader.com, want photographs of the vehicles to include graphic overlays 140 while the dealership's preference for its retail website is to use the photographs of the vehicles without the graphic overlays. To accommodate these different publishing preferences with the same set of vehicle photographs, the distribution controller 52 preferably includes a tool that allows the user to select the particular graphic overlays that will be used with the photographs that are published on various websites and to also select no graphic overlay for other websites. Examples of the graphic overlays and the options for the export distribution instructions 142 of the multimedia sales promotion are shown in FIG. 8C. In addition to choosing whether or not to include the graphic overlay with the photographs, the user can select which photos to include or exclude for each website. Although only two (2) website options are shown in FIG. 8C, additional websites can be included in this option. Additionally, as evident from FIG. 8C, different graphic overlays can be created and selected for use with different photographs and the user can also use different graphic overlays for different websites.

In addition to the various photo and video media used in the multimedia sales promotions described herein, the custom multimedia portions may also include custom audio options as indicated in FIG. 9A, including but not limited to a recorded voice message, a selected music, a voice message with music, an original video audio, and a silent audio. After the user has completed formatting the photo and video portions of the multimedia promotion within the photo and video editor, respectively, the user can use the audio editor to record voiceover and blend music tracks to the video media. Although any type of audio may be used, the system is capable of recording a speaker's voice as well as a speaker's voice with music. Additionally, a user may choose to have a silent promotion or a promotion with the original background noise of the video.

Figure 9D:
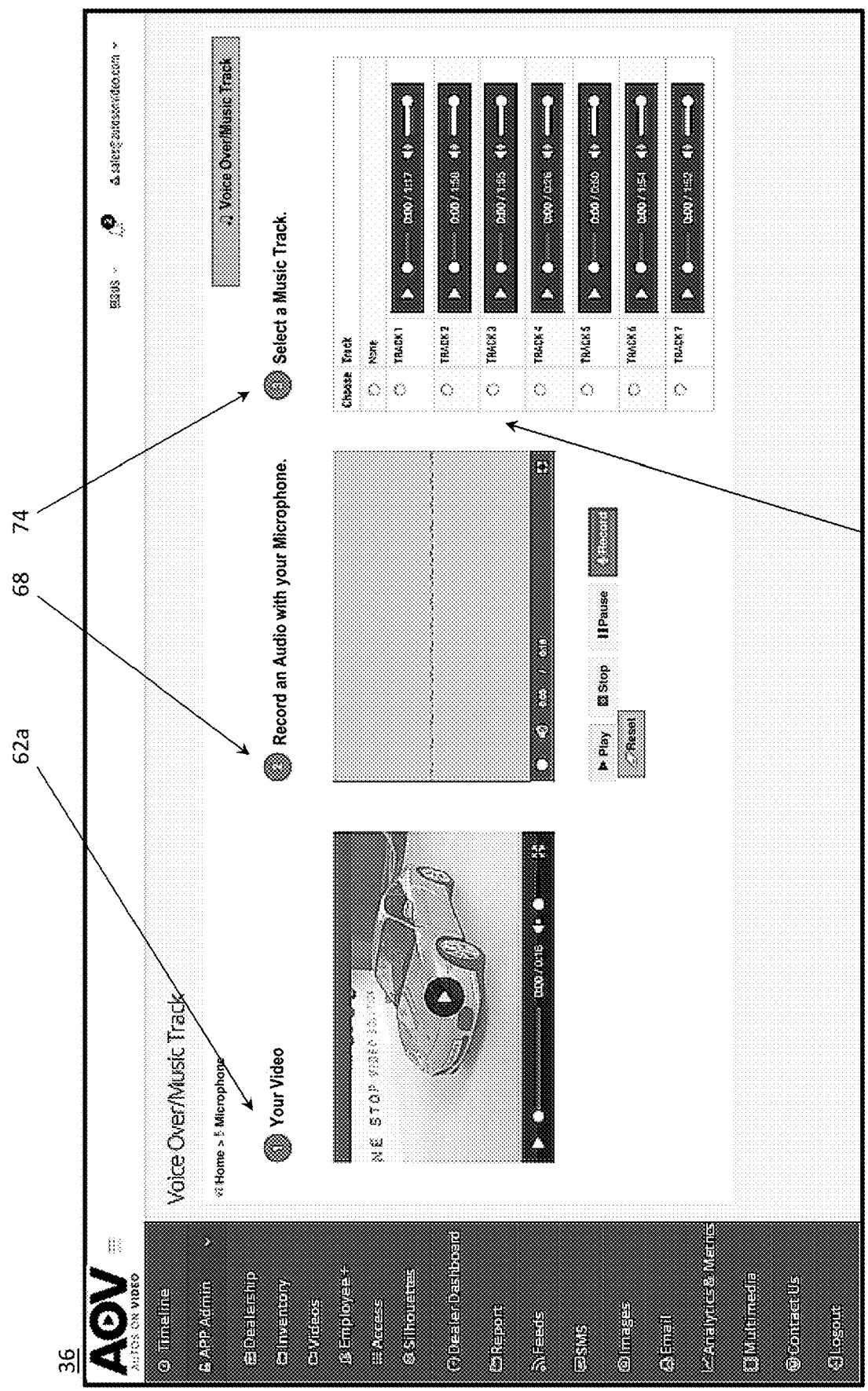
FIG. 9D is a screenshot of the full-screen multimedia dashboard audio creation screen.

Once an option is selected, the user is prompted with the screen depicted on FIG. 9B where the user can select which video multimedia segment they want to edit, such as by recording a voiceover 68. Subsequently, the user can use the microphone on the computing device to record the voiceover, such as shown in FIGS. 9C and 9D. As shown in FIG. 9C, a voiceover script can be saved to the dashboard application in a script field 84 for a particular product, and the user can record the voiceover as the video is playing in a video field 86 on the same display screen 32 as the script field. It will also be appreciated that a single voiceover can be shared by different users. As shown in FIG. 9D, the dashboard application can also provide the user with one or more music tracks that the user can blend with a voiceover. The screens shown in FIGS. 9A-9C are examples of the multimedia dashboard application 36 as it is formatted for operation on a smartphone and some tablet computers while the screen shown in FIG. 9D is an example of the multimedia dashboard application as it is formatted for operation on laptop and desktop computers. The functionality of the differently formatted dashboard applications remain consistent between the different hardware platforms. Generally, regardless of the formatting of the software on different computing devices 16, the dashboard application provides the user with post production options to complete the multimedia promotion, including selecting multimedia production options for a promotion based on product VIN, HIN, SKU, MLS number, or other specific product identifiers. The user operates the dashboard application to store the audio track to the inventory database.

In another embodiment, the distribution server may also distribute a livestream made up of live video 106 and the ambient audio and may also include a live text chat 108 between the user running the multimedia application and one or more potential buyers. In this embodiment, the computing device's camera creates the livestream media while the computing device's communications module 24 supports the live text chat, and the distribution server preferably connects the livestream media from the computing device to an external link that connect the buyers into the livestream and chat. Accordingly, a user can interact with a customer in real time to display products and product information, beyond that held in the inventory database or in premade promotions. Additionally, the livestream may also be recorded by the computing device and saved into its storage memory as well as uploaded to the inventory database by either the computing device or the distribution server.

Figure 3B:
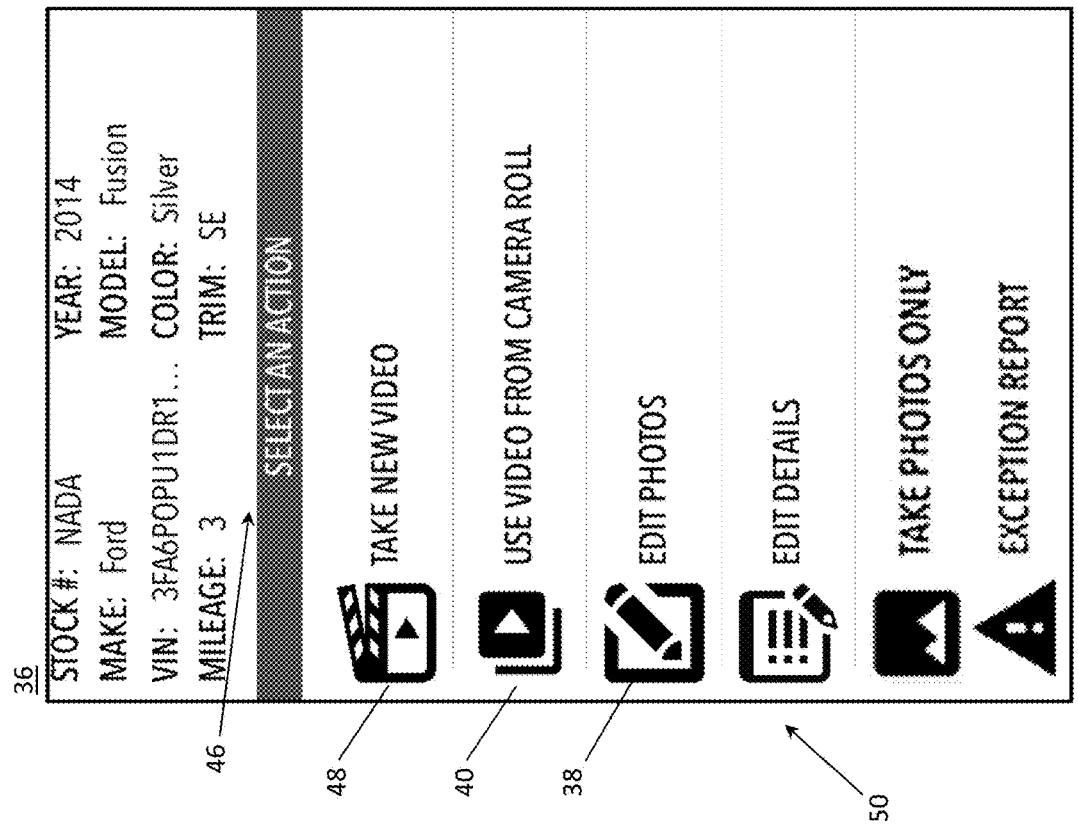
FIGS. 3A and 3B are screenshots of the multimedia dashboard smartphone login screen and item selection screen, respectively.
Figure 3A:
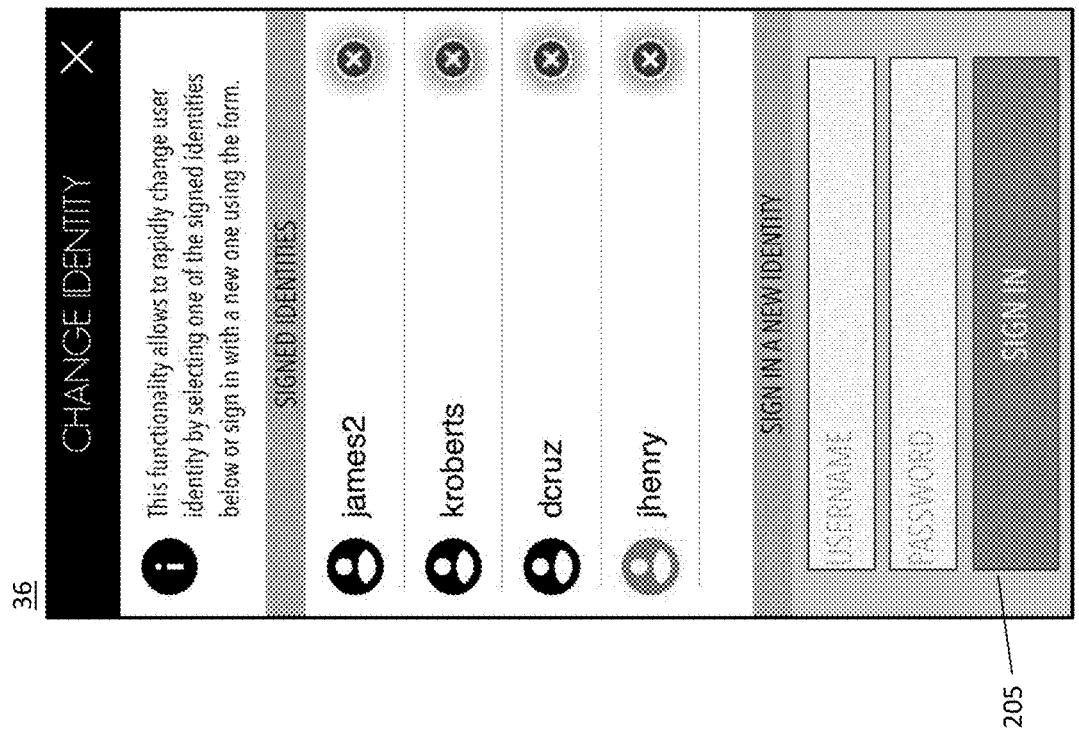
Figure 3E:
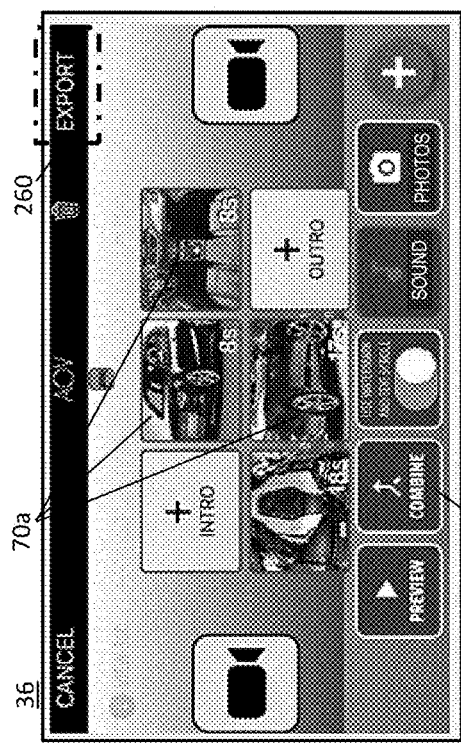
Figure 3F:
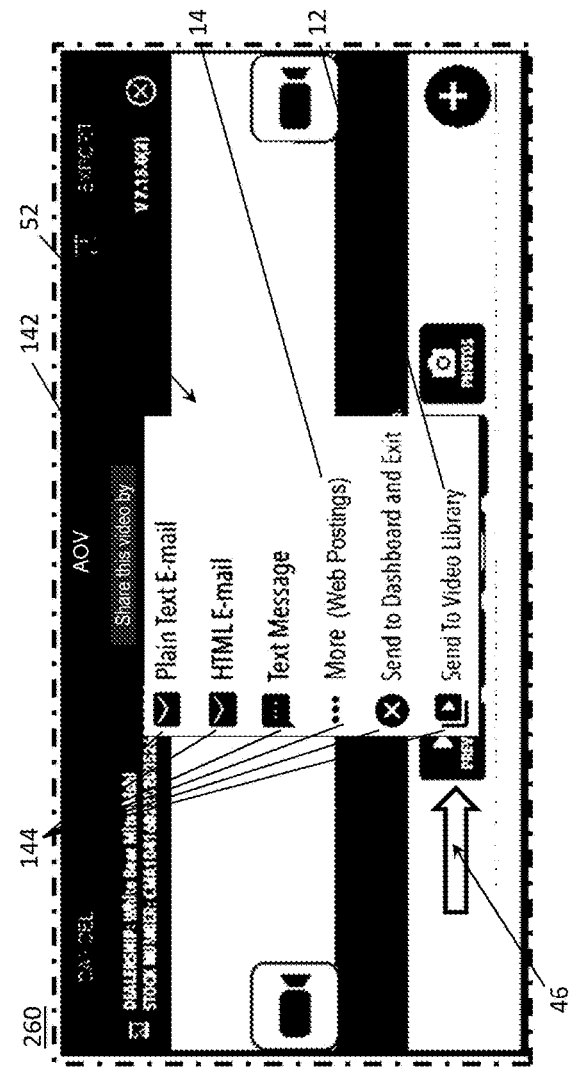
FIG. 3F is a screenshot of the multimedia dashboard smartphone video creation and editing screens with a pop-up window for the export function.
Figure 6A:
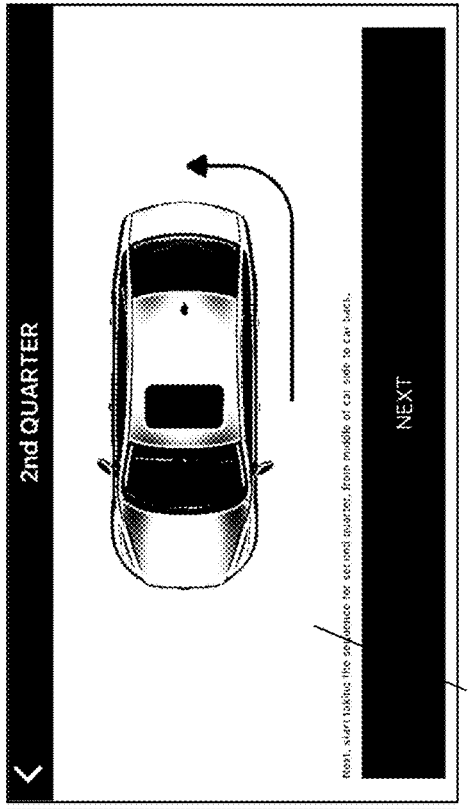
FIGS. 6A, 6B, 6C and 6D are screenshots of the multimedia dashboard View 360 four sequence smartphone video prompt screens.
Figure 6B:
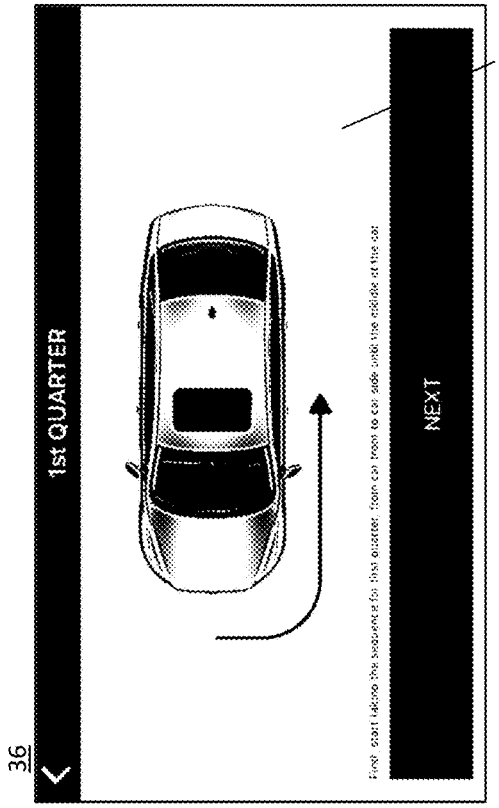
Figure 6C:
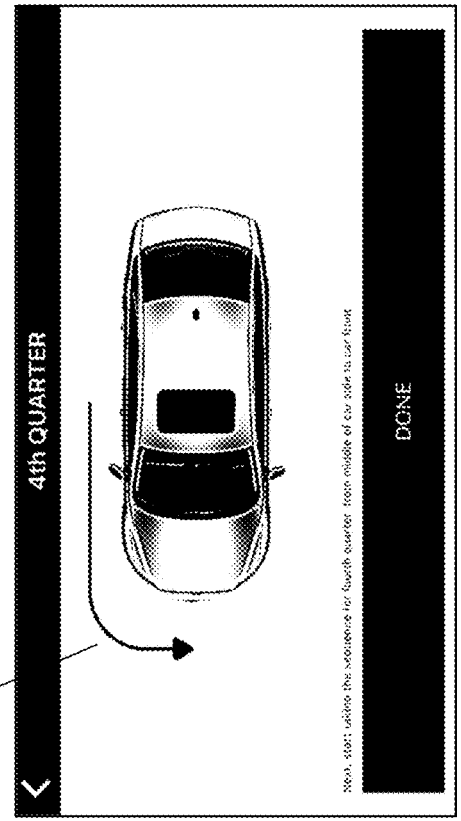
Figure 6D:
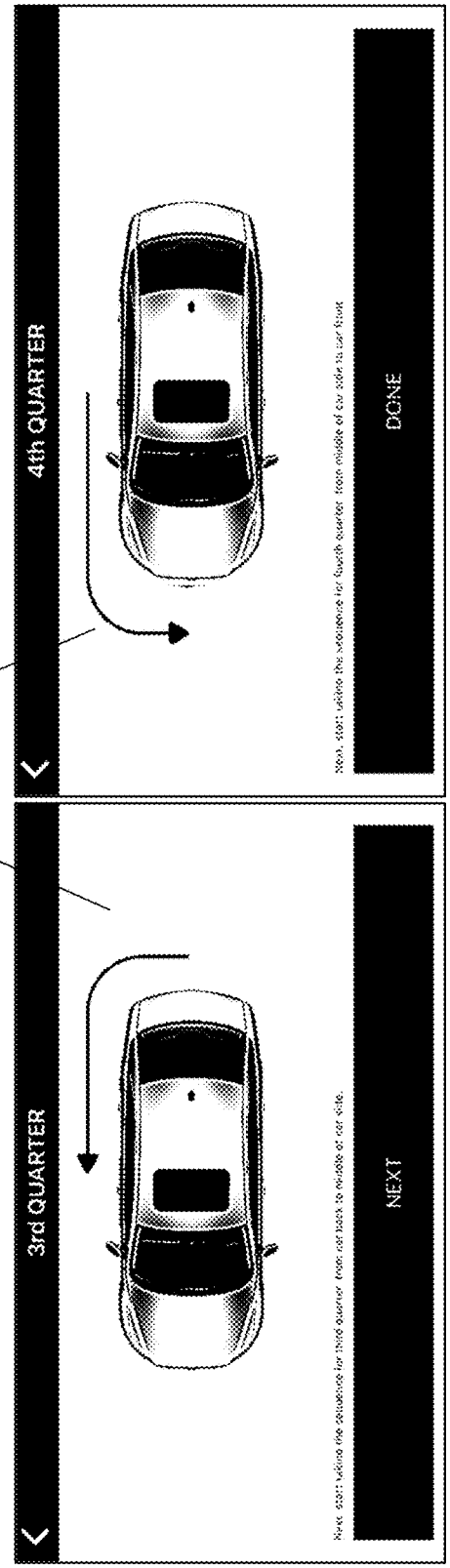
Figure 11A:
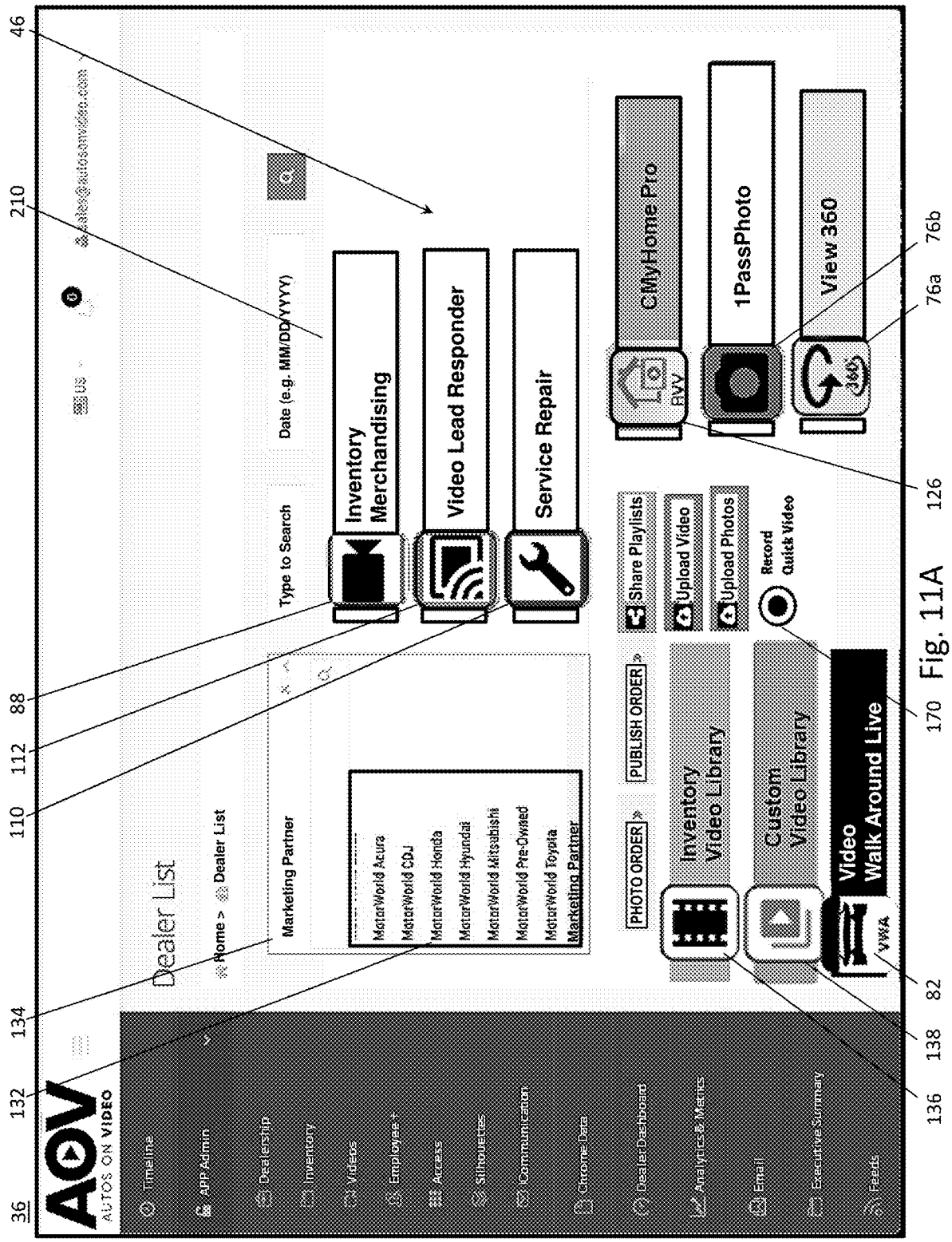
FIG. 11A is a screenshot of the full-screen application menu screen for the multimedia dashboard application options.

Other aspects of the multimedia system include allowing authorized users to share a device without having to repeatedly login and logout to access their custom profile, such as shown in FIG. 3A. As a protection against losing data and work as a result of catastrophic failure, an auto-save of work is performed as the user progresses through each step in the process. When the user logs back into the multimedia dashboard application, they are informed that there is work-in-progress 118 and may continue where they left off, such as shown in in FIG. 10A. The user can continue with the active project or can select any of the other software application modules provided in the dashboard application as displayed in the top-level menu 210. As shown in FIGS. 10B and 10C, users can select particular products 124 from the inventory 18, such as new and preowned vehicles, and work on multiple promotions 58*a* and 58*b* at a time and save their work as they go before uploading the completed multimedia sales promotion. Similar to the screens shown in FIGS. 9A-9C, the screen shown in FIG. 10A is an example of the multimedia dashboard application 36 as it is formatted for operation on a smartphone and some tablet computers while the screen shown in FIG. 11A is an example of the multimedia dashboard application as it is formatted for operation on laptop and desktop computers.

As shown on FIG. 10A, the multimedia dashboard application includes a quick video tool 170 that activates the camera so the user to take portrait style videos (9:16 format) that can immediately be uploaded to a social media site 60*d*, such as Tik-Tok, Instagram, and Facebook. As with the videos described above, the quick video can also be edited if desired. If the user does not want to edit the quick video before it is uploaded to the social media site, it could be uploaded without any sound or with the ambient sound that is recorded with the video. If the user wants to edit the quick video before it is uploaded, it could be combined with a sound track that is retrieved from the database 12, 12', such as music or a voiceover, or an overlay or other graphics could be added to the quick video. The quick video tool is different from the standard video editing process in which the multimedia promotion is first uploaded to the distribution server before it is uploaded to a website. When the quick video tool is selected, the editor automatically combines the audio track with the quick-video into the edited multimedia segment, and the multimedia dashboard application automatically formats the edited multimedia segment into the multimedia promotion with a format that is accepted by the social media site so the multimedia dashboard application can upload the multimedia promotion directly to the social media site rather than first uploading it to the distribution server. Of course, it will also be appreciated that the quick video tool could be configured in a way that the multimedia promotion is automatically uploaded to the distribution server and is either simultaneously or sequentially automatically uploaded to the social media site.

Moreover, this system can be used to create custom digital brochures for each item, so that promotional materials can be tailored to individual buyers for a given item. Once the photos and videos have been edited, and the digital brochures generated, the materials can be uploaded to distribution server for distribution to the retailer's website, online shopping bazaars, third-party marketing services, and/or social media portals. The individual digital brochures or links to the brochures can also be communicated to customers or potential buyers.

It will be appreciated that the multimedia dashboard application can be used with inventory databases for many different types of products as well as services. For example, as indicated above, any product can be listed in the inventory database according to a SKU, VIN, HIN, SN, MLS number, tail number, name or other identification code. Accordingly, although the tools and functionality of the present invention have been described with reference to automobiles, it will be appreciated that the present invention can be used for other types of vehicles as well as selling or leasing real estate, including residential properties or commercial properties. In selling and leasing real estate, the same tools and functionality of the automobile version of the system (Autos On Video®) can be rebranded for a real estate version of the system (CMyHome Pro™) Generally, for whatever type of product or service is being sold to a customer, the multimedia dashboard application allows users to record the product videos or service videos or retrieve prerecorded videos for the product or service and edit the videos with the voiceovers, intro videos, outro videos, distribute and manage the completed multimedia sales promotion as well as the other functions and tools as described above, such as the closed-captioning, the stitched videos from photos, and the text-to-speech. Accordingly, it will be appreciated that the base videos 62 can be a product video 62a or a service video 62b that the user can combine other multimedia segments, including their own intro 64 and/or outro 66.

When the multimedia dashboard application is being used for real estate properties, the properties can be uniquely identified in the inventory database using their unique MLS numbers. When leasing properties, the unique address information can be used in the inventory database, including particular floors or suite numbers for commercial properties and apartment numbers for residential properties. Similar to the sales representatives within a car dealership, the real estate agents working with a particular broker use the rebranded multimedia dashboard application to access a shared library of videos and photographs for the properties in the inventory database; they can create videos and photos and other multimedia segments 220, preview and edit the multimedia segments 230, customize the audio used with the multimedia segments 240, such as adding a unique intro and/or outro as well as a voiceover and/or music, add special features 250, such as graphic overlays, and exporting the multimedia segments and final multimedia sales promotion 260 which includes saving the multimedia segments and the multimedia sales promotion in the inventory database. It will be appreciated that the closed captioning and the text-to-speech voiceover with the stitched audio-video file can be considered a customizing of the audio 240 and/or a special feature 250. Also, as with the automobile version of the system, the real estate agents also use the multimedia dashboard application to control the distribution of the multimedia sales promotion through the distribution server.

Figure 11C:
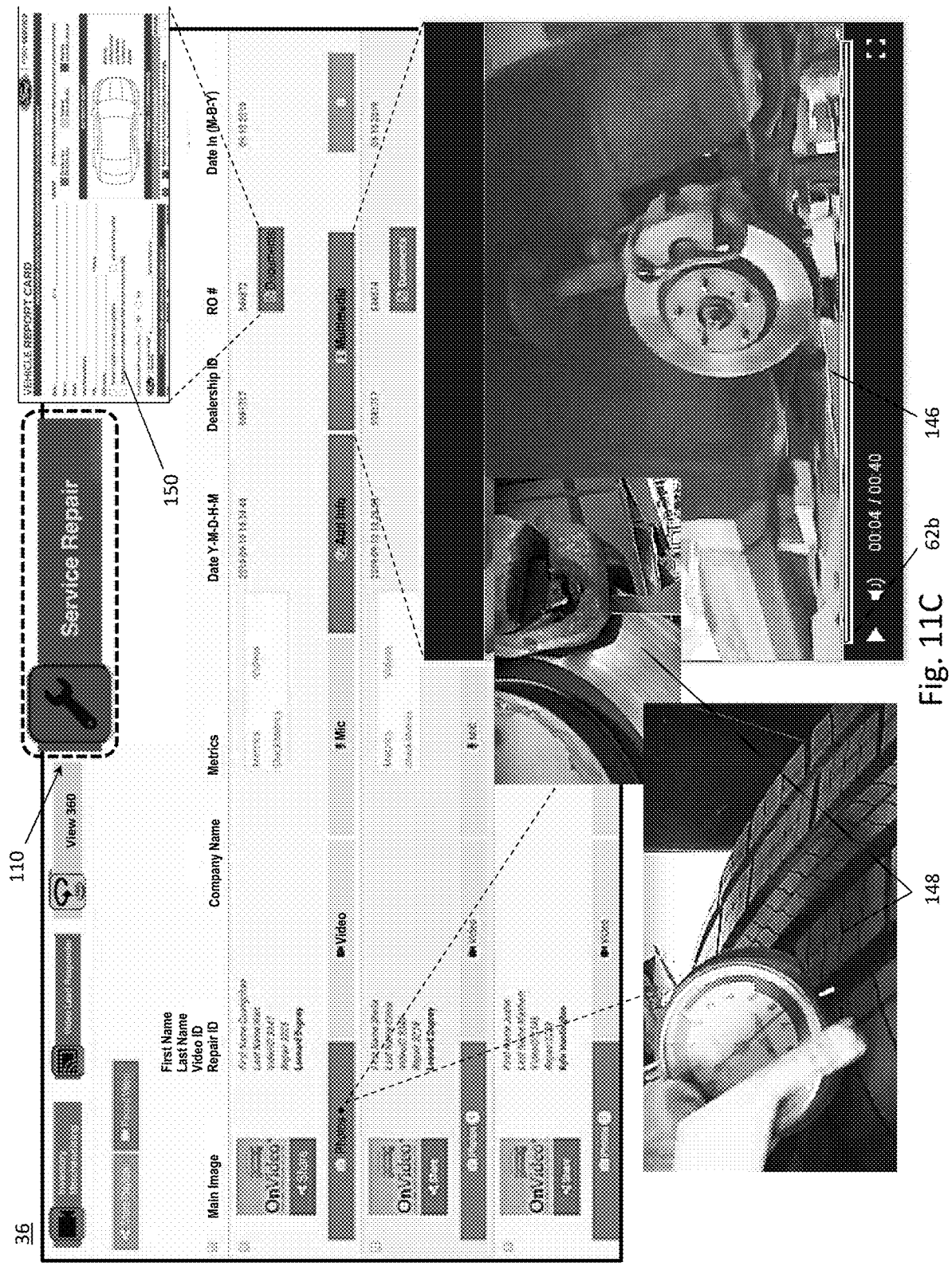
FIG. 11C are screenshots of the service repair module with representative photographs and video still for the full-screen multimedia dashboard application.

Generally, the present invention is best used for products that have a unique identification number for each item, such as automobiles, motorcycles, trucks, real estate listings, recreational vehicles, boats, planes, buses, commercial vehicles and equipment, and machinery. It will also be appreciated that the tools and functionality of the present invention can be used in selling couture fashions, fine jewelry, works of art, and collectibles, such as rare coins, manuscripts, first edition prints, trading cards, etc. Finally, the tools and functionality of the present invention can be used in selling services. For example, as described above and shown in FIG. 11C, in providing maintenance and repair services for a vehicle, the technician and/or automotive service manager (ASM) can use the service repair module 110 to take videos 146 and photographs 148 of the maintenance and/or repair work that is recommended and can store along with a service report 150 the multimedia segments in a service database that is similar to the inventory database so that the video can be reviewed by the service coordinator and/or the service manager and then sent to the customer. It would also be possible to edit the video with a voiceover as well as photographs and graphics that may helpful to explain the recommendations and an intro and/or outro with additional information for the customer to consider.

The service repair module can be integrated into the inventory database and distribution server as described above or it could be integrated into existing service software systems that are generally known as electronic scheduling inspection tools. The service repair module can generate a shortened URL video link that can be incorporated into a more comprehensive service repair diagnostic report and/or work estimate, or the module can be used in conjunction with existing scheduling inspection software solutions which include email, text/SMS, direct messaging (DM), or any other electronic communication methodology to communicate servicing information to customers. Although not necessary for direct communications with customers, it is possible to include a customer module within the multimedia dashboard application which would provide bidirectional communication within the app and would allow customers to send video of their service requests to the service department. Similarly, the present invention could be used to sell services in many industries, such as real estate leases, home and commercial property inspection and maintenance services, industrial design services, information technology and computer technology support services, such as software development services, and professional services, such as legal services, CPA services, medical services, etc.

A representative screen from the multimedia dashboard 36 is shown in FIG. 11A with the top-level menu 210 displaying the various modules that are available to the user. As an end-to-end solution, the system of the present invention preferably includes a vendor module 128 that the businesses 132 which are selling the products and/or services can collaboratively use with their marketing partners 134, such as professional marketing agencies and multimedia production studios. The marketing partners produce multimedia segments that the businesses' representatives can retrieve directly from within the multimedia dashboard application 36, without having to retrieve the multimedia segments from some other source or having to open or run another software application. As generally shown in FIGS. 1A, 1C, and 2, the vendor module 128 in the multimedia dashboard application includes the same tools and functionality as in the inventory merchandising module 88, the video lead responder module 112, and other modules, such as the specialty photo module(s) 76, the maintenance and repair service 110, and the real estate module 126. Generally, the multimedia segments created and edited by the business' representatives for the products in the inventory database are catalogued in the inventory video library 136. When the business' marketing vendor creates multimedia segments, such as base videos of products in the inventory or services (which may include audio), general b-roll, and/or establishing shots and photographs, the vendor can save and catalogue them in a custom video library 138 that is also available to the business' representatives. It will be appreciated that although the multimedia segments produced by the business' marketing partner may be created within the multimedia dashboard application, it is also possible for the marketing partner to create professional videos using their specialty multimedia software systems outside of the dashboard application in which case the custom video library module is used to upload the multimedia segments for further use with the dashboard application.

Regardless of how the marketing partner 134 produces the base video, the integration of the custom video library module with the inventory database with access to the base video through the multimedia dashboard application allows the sales representative with the business 132 to select multimedia segments from one or more base videos in the custom video library 138 with the multimedia dashboard application and without having to open or otherwise run any other application. Accordingly, the system of the present invention not only allows for integration and connectivity of the separate tasks of recording multimedia segments, editing the segments into multimedia promotions, and distributing the multimedia promotions within the multimedia dashboard application in networked connection with the inventory database and the distribution server as an end-to-end software solution without having to add or otherwise open and run another software application with the dashboard application, the present invention also integrates the work of vendors by including their multimedia segments within the custom video library that is also available through the multimedia dashboard application. The multimedia dashboard application is preferably used in combination with the inventory database and the distribution server as described in detail above so the multimedia segments can be most efficiently shared between users. However, it will be appreciated that the benefits of the integrated multimedia dashboard application could even have value apart from its operation with a collectively shared inventory database and distribution server as described above. For example, a sole proprietor could use the integrated multimedia dashboard without sharing the multimedia segments with anyone else, and in this case, the inventory database could be local in the computing device' memory storage and a distribution module could replace the distribution server.

The methodology for using a base video from the custom video library to create a multimedia sales promotion is essentially the same as when the base video is taken from the inventory video library. The schematic representation of the process for creating the multimedia sales promotion with the multimedia segments is shown in FIG. 11B. The base video is selected from the custom video library. There are different options for merging the intro and/or outro with the base video to produce the multimedia sales promotion. In one option, the intro and/or outro can be recorded with a webcam. In another option, a default intro and/or outro that is stored in the inventory video library can be selected; similarly, the intro and/or outro can be uploaded from local computer storage. In yet another option, a user can choose to skip the intro and move straight to the creating or selecting the outro to be used. When the multimedia sales promotion is complete and ready for export, the user can select the various forms of electronic communication, including posting to various social media and retail web portals and direct communication options as described above.

Figure 12:
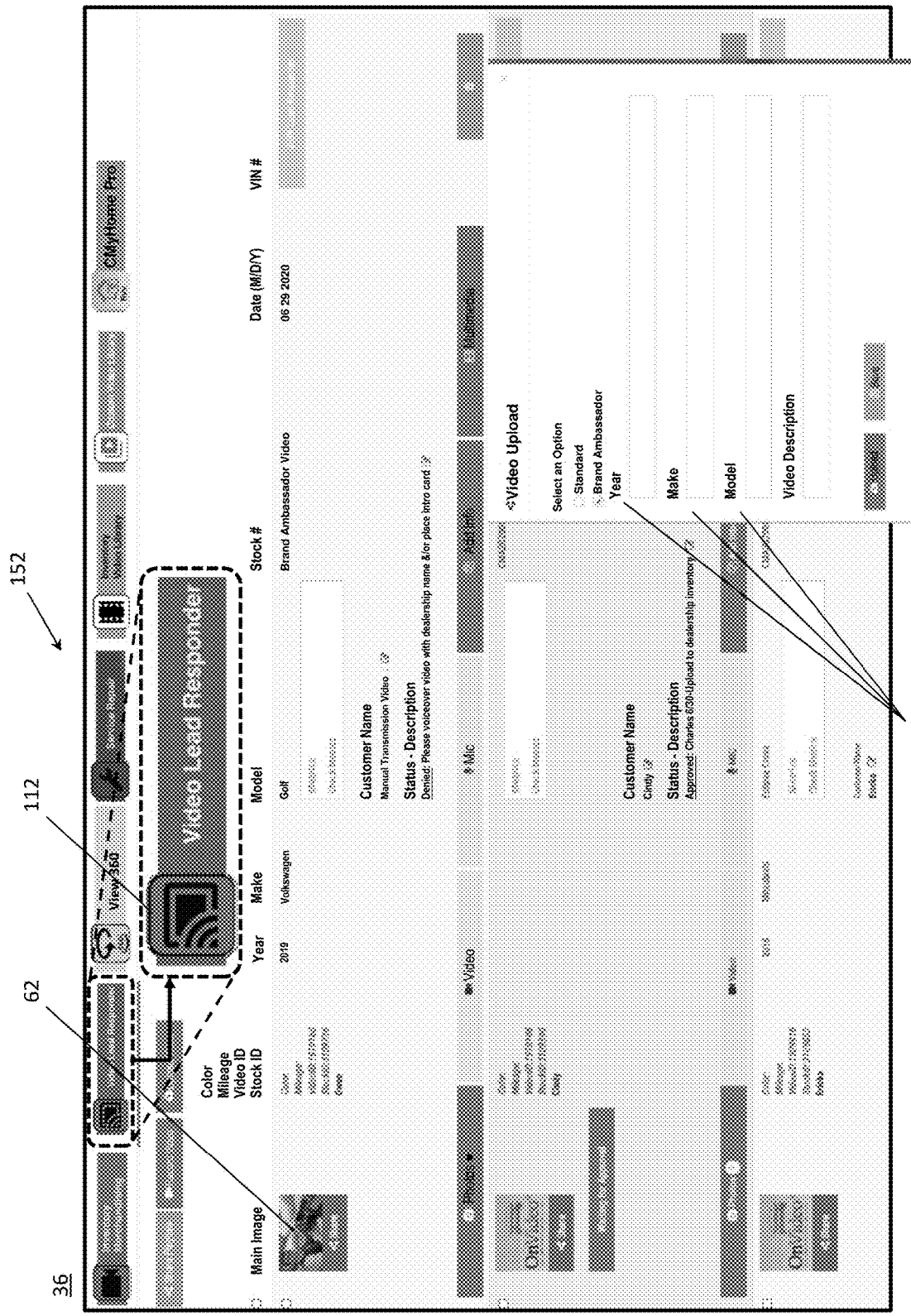
FIG. 12 is a screenshot of the brand ambassador interface screen for the full-screen multimedia dashboard application.

The multimedia dashboard application 36 also provides a collaborative workspace for coordinating multimedia promotions with sponsors, endorsers, and/or social media influencers that act as brand ambassadors for the products and/or services being sold. As shown in FIG. 12, using a brand ambassador collaboration screen 152 in the sales leads "Video Lead Responder" (VLR) module 112, the marketing partner can submit their base video 62 for approval through the brand ambassador collaboration screen. As described above, the marketing partner can enter product information 156 into preset fields for the goods or services that are the subject of the video along with a general description of the video that is being uploaded. When the authorized representative for the business approves the base video, the representative and/or marketing partner can enter a set of distribution instructions 142 into the multimedia dashboard application's distribution controller 52 for distributing the multimedia promotion with the base video. As shown in FIG. 11B, once the content is approved and made available through the inventory database, authorized users of the system can export the content to social sites, such as posting to Facebook®, Twitter®, Linked In®, and Google® and can replicate the content for other social media platforms as well as other postings to retail websites and direct electronic communications.

The incorporation of the brand ambassador collaboration screen within the system allows the selling business to more efficiently engage and work with social influencers who could be local to their business locations or who could otherwise be well-known throughout a state or the nation. The social influencers and other brand ambassadors create original content in the form of base videos or other multimedia segments that they can upload to the inventory database with a request for review and approval of the content for export. Rather than using separate applications to store and manage content, such as content residing on YouTube®, Dropbox®, Box®, Vimeo® or some other repository while the review and approval is performed through some other software application, the inventory database provides a central repository for the content while the collaboration screen provides a central catalogue interface for the management, review, and approval of the content. The collaboration screen also allows the users of the multimedia dashboard application to check on the status as well as usage and activity. Just as with other multimedia segments created by sales representatives and other marketing partners, once the content is uploaded to the inventory database, catalogued in the ambassador collaboration screen, and approved for distribution, the content is available to authorized users of the multimedia dashboard application to use and export in their multimedia sales promotions. In particular, when the content is approved as complaint, the multimedia segment can be moved from a folder in the VLR module to the brand ambassador's central repository file in the inventory database which is available through any of the modules in the multimedia dashboard application.

The VLR can also be used to produce service videos. For example, a service manager can take custom video and/or photographs of a vehicle that is in for service or may use prepackaged informational videos and/or photographs. Similar to the sales leads described above, the sales manager would create an Intro (10 s) voiceover, merge it with one or more videos and/or photographs, such as a Cabin Air Filter video (12 s), Engine Air Filter video (12 s), and/or Informational Video on Cabin Air Filter (12 s) and/or Engine Air Filter (20 s), and would conclude with the Outro (10 s) voiceover.

The brand ambassadors can use the multimedia dashboard application to create their content and catalogue and upload the content to the inventory database directly through the application. Brand managers also have the option to create content through their favorite video editor and production applications that allows for more customization, such as iMovie®, Final Cut®, Adobe Premier®, Vimeo® and other separate applications, and they can then upload the content using the multimedia dashboard application. Other marketing partners, such as advertising agencies, are given access to the brand ambassador collaboration screen to more efficiently coordinate sales and marketing efforts with representatives from within the business as well as the external marketing partners. Towards this end, the brand ambassador collaboration screen includes preset fields for entering basic information and also provides additional fields for the authorized users to add descriptions and notes.

The computing device described herein is preferably a handheld smartphone but may alternatively be any mobile computer including, but not limited to a tablet computer and a laptop computer. As explained above, the multimedia dashboard application is a software program that is executed as machine-readable code on a computer processor for causing, when executed, the steps of the multimedia creation and management system. The multimedia dashboard application can either be loaded directly onto the computing device or accessed on a hosted platform by the computing device using a web browser. Additionally, in a cloud computing environment, the computing device may access the multimedia dashboard application software via the web browser using the internet, extranet, intranet, host server or internet cloud.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described in detail, and the details of tools known in the art are omitted. For the same reason, the computer hardware is not described in detail. It should thus be understood that the invention is not limited to any specific computer language, program, or computer. It is further contemplated that the present invention may be run on a stand-alone computer system, or may be run from a server computer system that can be accessed by a plurality of client computer systems interconnected by a communications network 56. In addition, as evident from the description of the present invention's features, tools and functionality, the marketing and maintenance and repair aspects of the multimedia dashboard application can be used in a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

Figure 13A:
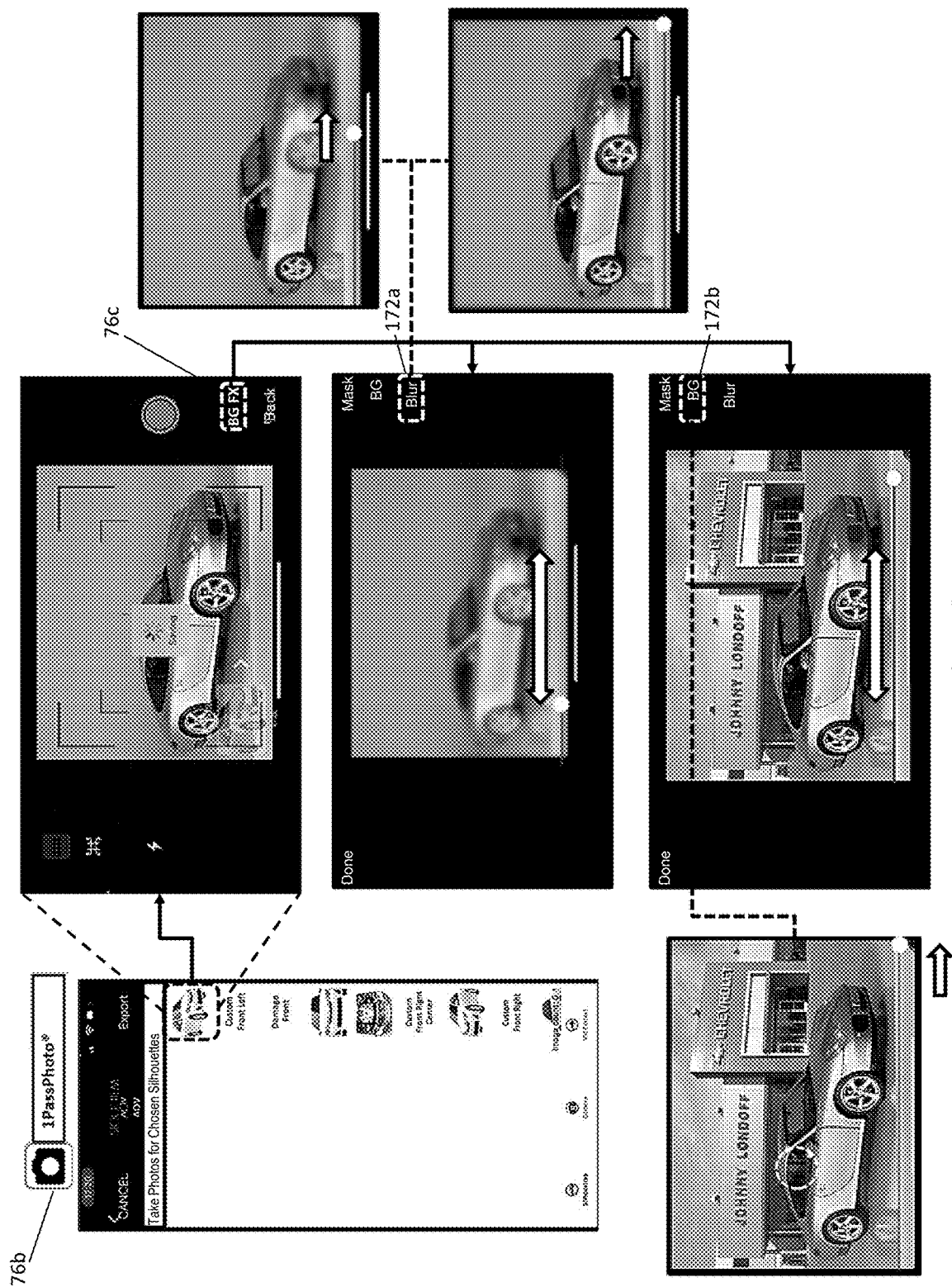
FIG. 13A is a flow diagram with screenshots of a photo that is modified using the background effect tool in the multimedia dashboard application.

The multimedia dashboard application also has a background effects tool (BG FX) 76c that is preferably a part of one or more of the existing photo modules, such as the 1PassPhoto® photograph creation and editing module 76b as shown in FIG. 13A, although the tool could be provided as its own specialty photo module. In comparison with the background effects tools that are in current standalone multimedia editing applications and smartphone photo apps which are generally described in the background section above, the multimedia dashboard application's background effects tool allows the user to take photos in the same multimedia dashboard application in which the photos are edited, selected, and combined into a multimedia promotion as well as distributing the multimedia promotion. Generally, the user takes a photo and the photo editing module and can immediately provide the user the optional editing tools for the blurring effect (Blur) 172a and the background image filter (BG) 172b or can first give the user the option to select the BG FX tool. As particularly illustrated in FIG. 13A and described in more detail below, a slider bar controller is used to modify the foreground and background in a semi-automatic mode of operation.

Figure 13B:
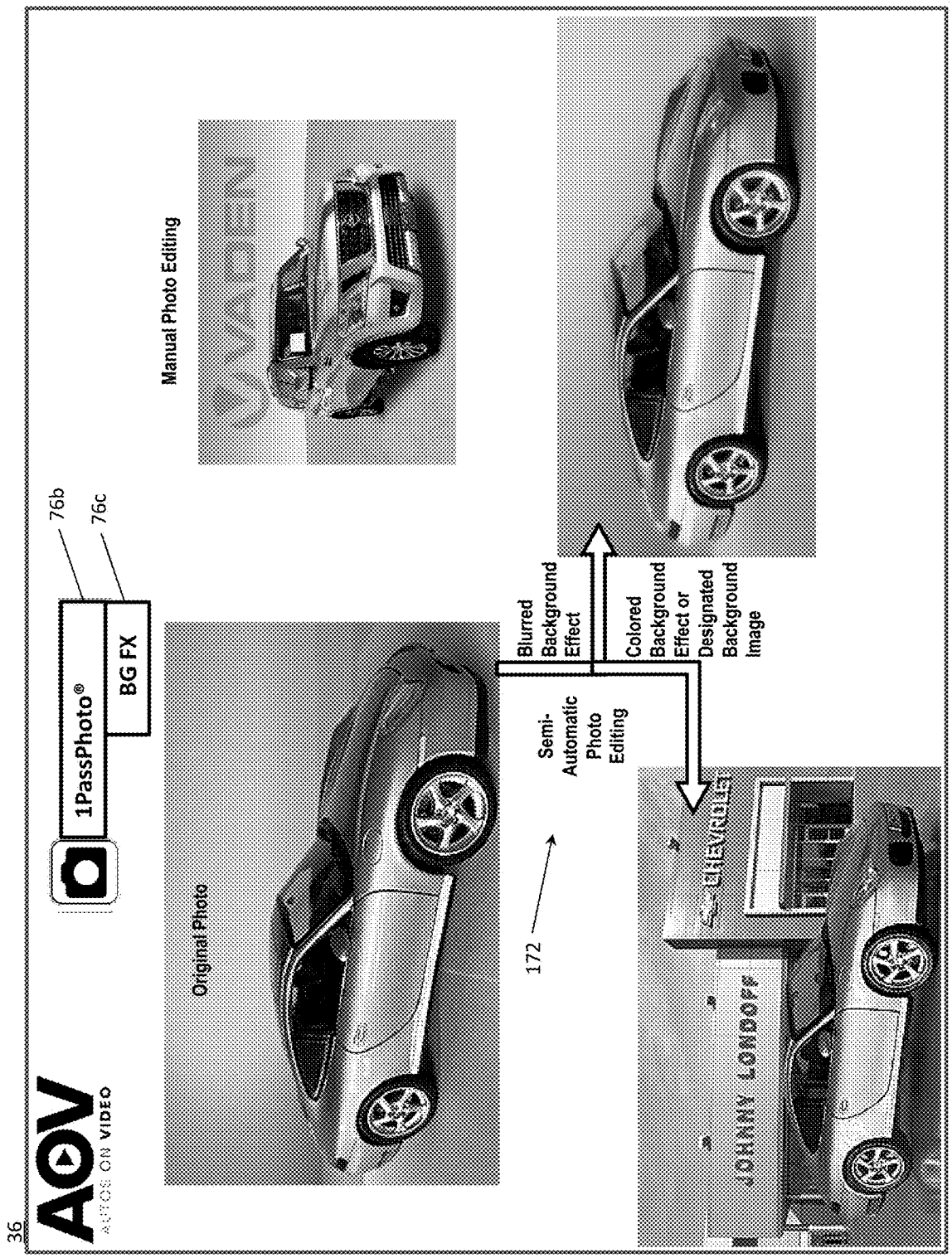
FIG. 13B is a schematic representation of the original photo in FIG. 13A with modified versions of the photo after being modified using the background effect tool and another photo that is modified using a standard manual mode of operation.

For the blurring effect, the slider bar controller adjusts the depth of field for the image. In a neutral position, a tuner for the slider bar controller has a preset depth of field. In one direction from neutral, the tuner decreases the depth of field by reducing the focal length for the image which decreases the sharpness of the background and increases its blurring. In the opposite direction from neutral, the tuner increases the depth of field by enlarging the focal length for the image thereby which increases the sharpness of the background and decreases its blurring. For the background image filter, the slider bar controller's neutral position fades out a portion of the primary image's background and fades in the background image in its place. In one direction from neutral, the tuner does not provide any fading out of the primary image, and as the tuner is moved past the neutral position in an opposite direction, more of the primary image's background is replaced with the background image. Continuing to slide the tuner away from the neutral position can cause portions of the primary image's foreground to be replaced by the background image. A localized control can be used to select sections of the primary image and adjust the fading between the primary image and the background image within the selected sections. It will be appreciated that the background image can be a photograph, a graphic image, or a solid color. As shown in FIG. 13B, the background effects tool is a semi-automatic mode of operation that can be used in place of the standard manual mode of operation.

Figure 14:
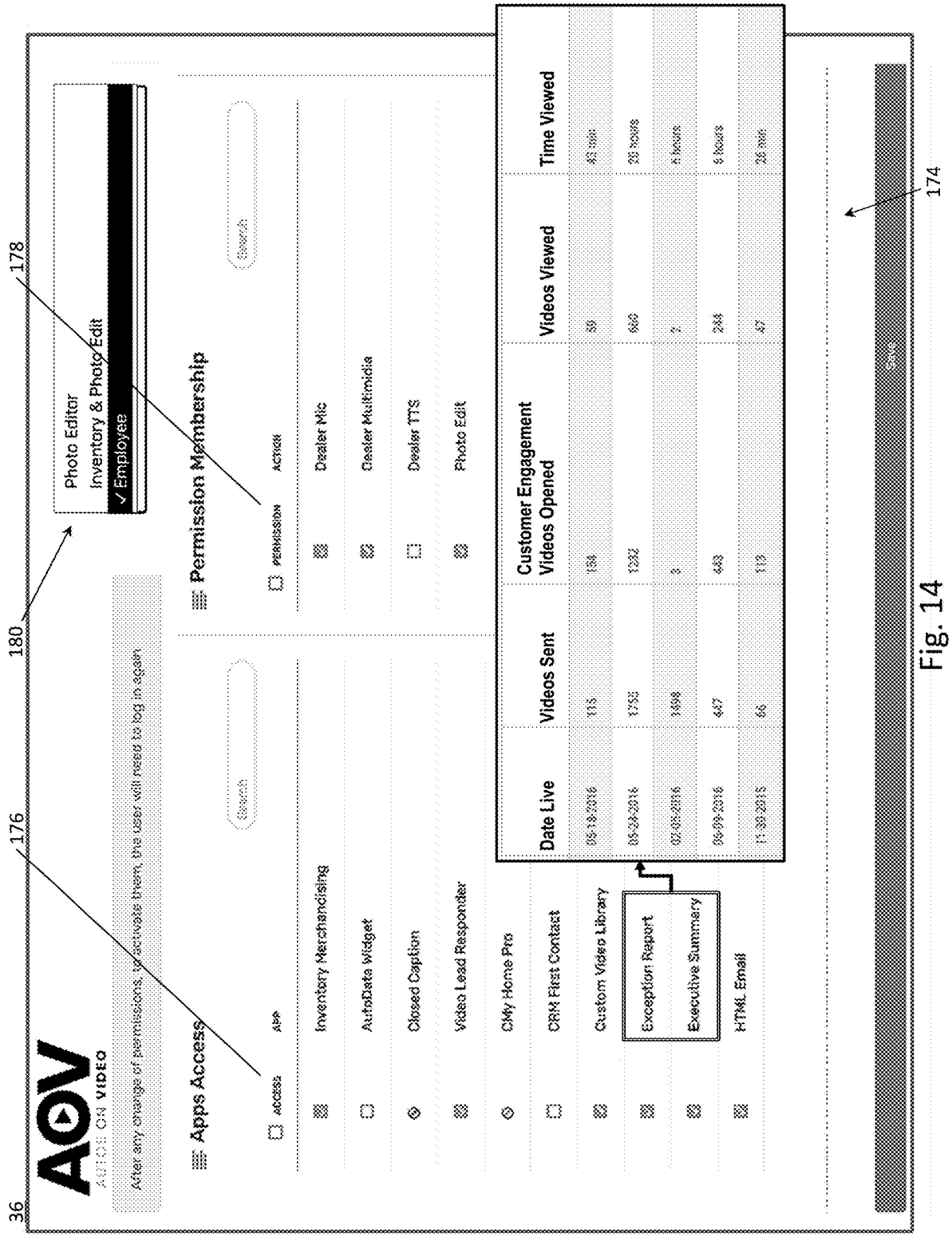
FIG. 14 is a screenshot of an administrative screen in the multimedia dashboard application with an exemplary administrative report.

The administration tools 174 for the multimedia dashboard application are shown in FIG. 14. The administrator can assign to each individual user an applications access 176 and an action permission 178 for each one of the multimedia add-on modules and functionality that are available through the multimedia dashboard application. As particularly shown in FIG. 14, the administrator controls users' rights to the following multimedia add-on modules and functionality: Inventory Merchandising; data sharing widgets, such as a widget to use J.D. Power's Autodata Services to send a video of a vehicle and related short feature videos about notable features vehicle has; Closed Caption; Video Lead Responder; CMy Home Pro real estate sales module; Administrative Reports, such as an Exception Report or an Executive Summary; and HTML Email. The administrator can save and assign the rights to the various add-on modules as a group based on the roles of the users 180, such as "Photo Editor" rights, "Inventory & Photo Edit" rights, and general "Employee" rights. The rights granted to the users can differentiate between different levels of functionality; for example, the standard distribution permission given to users of the multimedia dashboard application is for text-only email service which is the basic level of email functionality whereas the HTML Email permission is a higher level of functionality that allows the user the additional ability to create and send html-formatted email correspondence through the distribution server.

The administrator also controls users' rights to the following multimedia tools provided through the multimedia dashboard application: audio recording functions through the application's microphone function; video recording functions through the application's camera function; access to the dealer multimedia files; access to the text-to-speech functionality for the automated voiceovers; and photo editing functionality, such as for the background effect tools described above. With regard to the grouping of particular types of users, it is possible to have one set of permissions for users that have the ability to edit the inventory as well as the multimedia files associated with the inventory while another set of users would only have multimedia editing authorization and would not have the authority to add, remove or otherwise edit the inventory. Of course, it is expected that many users that are in the sales staff and the maintenance and repair service manager would have both editing authorization so they can create the multimedia promotions and other customer correspondence with photos, videos, and closed captions and/or soundtracks and can release the edited videos through the distribution server.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method for recording, producing, and communicating a multimedia promotion with a computer device comprising a computer processor, a memory, a camera, a microphone, a display screen, a user interface, and a communications module, comprising:
   selecting a set of multimedia segments relating to a corresponding set of items in an inventory database via a multimedia dashboard application executing on the computer processor and without opening another application, wherein the multimedia segments are comprised of a plurality of photos, a plurality of videos, and a plurality of audio tracks;
   recording a new multimedia segment to the memory using at least one of the camera and the microphone under control of the multimedia dashboard application executing on the computer processor;
   editing at least one of the new multimedia segment and the selected multimedia segments using the multimedia dashboard application executing on the computer processor to produce at least one edited multimedia segment;
   generating via the multimedia dashboard application executing on the computer processor the multimedia promotion with the edited multimedia segment; and
   uploading at least one of the new multimedia segment and the multimedia promotion from the computer processor to at least one the inventory database and a social media site via the multimedia dashboard application executing on the computer processor.

2. The method of claim 1, wherein the editing step is comprised of adding closed-captioning to at least one of the new multimedia segments and the selected multimedia segments, and wherein the editing step is further comprised of combining the new multimedia segment with the selected multimedia segments as the multimedia promotion without opening another application.

3. The method of claim 1, wherein the editing step is comprised of adding a voiceover track to at least one of the new multimedia segments and the selected multimedia segments, and wherein the editing step is further comprised of combining the new multimedia segment with the selected multimedia segments as the multimedia promotion without opening another application.

4. The method of claim 1, wherein the editing step is comprised of combining the plurality of photos into a stitched video, and wherein the editing step is further comprised of adding a text-to-speech voiceover track to the stitched video.

5. The method of claim 1, wherein the new multimedia segments and the selected multimedia segments are selected from the group of videos consisting of a base video, an intro video, an outro video, and any combination thereof, and wherein the editing step is further comprised of combining the new multimedia segment with the selected multimedia segments as the multimedia promotion without opening another application.

6. The method of claim 1, wherein the new multimedia segment is further comprised of a set of 360° videos taken around a product exterior, wherein the editing step is comprised of the multimedia dashboard application automatically selecting a plurality of frames from the set of 360° videos, and wherein the editing step is further comprised of the multimedia dashboard application automatically combining the selected frames into a rotatable 360° view.

7. The method of claim 6, wherein the editing step is further comprised of the steps of:
   tagging a set of features in a set of the selected frames in the rotatable 360° view with a corresponding set of feature identifiers; and
   linking at least one of a set of photos and a set of videos in the selected multimedia segments with the set of feature identifiers in the set of selected frames.

8. The method of claim 1, wherein the editing step is comprised of adding at least one of a background blurring effect and a background image filter to at least one of the photos or videos, and wherein the editing step is further comprised of combining the new multimedia segment with the selected multimedia segments as the multimedia promotion without opening another application.

9. The method of claim 1, wherein the step of selecting a set of multimedia segments is a selection of an audio track, wherein the recording step records a quick video using the camera, wherein the editing step automatically combines the audio track with the quick-video into the edited multimedia segment, wherein the generating step automatically formats the edited multimedia segment into the multimedia promotion with a format accepted by the social media site, and wherein the uploading step is comprised of uploading the multimedia promotion to the social media site.

10. The method of claim 1, further comprising the step of retrieving a base video from a video library, wherein the recording step is further comprised of recording a plurality of new multimedia segments, wherein a first multimedia segment is a custom voiceover track for the base video, wherein a second multimedia segment is at least one an intro video and an outro video, and wherein the editing step is further comprised of adding the custom voiceover track to the base video and adding at least one of the intro video and the outro video to the base video with the voiceover track using the multimedia dashboard application executing on the computer processor to produce a custom video.

11. The method of claim 1, further comprising the step of assigning to a set of users corresponding sets of authorizations, wherein a first set of authorizations is comprised of an application access set selected from the group consisting of inventory merchandising, closed captioning, video lead responder, realty sales, custom video library, exception report, executive summary, email, and any combination thereof, and wherein a second set of authorizations are comprised of an action permission set selected from the group consisting of an audio recording function, a video recording function, a text-to-speech function, and an editing function.

12. A method for adding closed captions to an audio-visual file with a computing device comprising a computer processor, a memory, a display screen, a user interface, and a communications module, the method comprising the steps of:
    under control of a client system,
        displaying a first image on the display screen of the computing device with a multimedia dashboard application executing on the computer processor;
        simultaneously displaying a second image on the display screen with the first image and a selection option for modifying the audio-visual file with closed captioning; and
        sending a closed caption creation instruction through the communications module to a server system in response to the selection option being chosen through the user interface;
    under control of a multimedia sales promotion segment of the server system,
        receiving the closed caption creation instruction;
        creating a set of closed captions corresponding with the audio-visual file by a voice-to-text transcription software module without further instruction from the computing device; and
        merging the set of closed captions with the audio-visual file into a merged audio-visual-closed caption file without further instruction from the computing device; and
        saving the merged audio-visual-closed caption file in the server system without further instruction from the computing device.

13. The method of claim 12, wherein the first image is selected from the group of images consisting of a text block identifying the audio-visual file, an icon of the audio-visual file, and at least one video frame from the audio-visual file, wherein the steps of creating the set of closed captions and merging the closed captions with the audio-visual file are further comprised of uploading the audio-video file to an online voice-to-text [VTT] plug-in service from the multimedia sales promotion segment, automatically producing the closed captions in a video text tracks [vtt-]format file with the online voice-to-text [VTT] plug-in service, combining the video text tracks [vtt-]format file with the audio-visual file into a merged audio-visual-closed caption file, and receiving the merged audio-visual-closed captions file back into the multimedia sales promotion segment.

14. The method of claim 12, further comprising the step of displaying on the display screen of the computing device a text display from the set of closed captions with a corresponding video frame from the audio-visual file.

15. The method of claim 14, further comprising the steps of:
    providing a text editor with the text display from the set of closed captions and the corresponding video frame and without further instruction from the computing device; and
    entering a set of edit instructions into the text editor through the user interface to modify text in the set of closed captions.

16. The method of claim 14, further comprising the steps of:
    saving the merged audio-visual-closed captions file to an inventory database; and
    distributing the merged audio-visual closed captions file through a distribution server according to a set of instructions sent from the multimedia dashboard application to the multimedia sales promotion segment.

17. The method of claim 12, further comprising the step of displaying a sequence of text displays from the set of closed captions with a corresponding set of video frames from the audio-visual file on the display screen of the computing device.

18. A multimedia dashboard application for recording, editing, and managing distribution of a multimedia promotion through at least one of an inventory database and a distribution server by operation on a first computing device comprising a computer processor, a communications module, a memory module, a camera, a microphone, a display screen, and a user interface, the multimedia dashboard application comprising:
    an item selector, wherein the item selector selects a set of multimedia segments from the inventory database according to a first user input entered into the multimedia dashboard application, wherein the set of multimedia segments is comprised of at least one of a set of photographs, a set of videos, and a set of audios;
    a recording module, wherein a second user input into the multimedia dashboard application causes the recording module to activate at least one of the camera and the microphone to produce a new multimedia segment without opening another application;
    a multimedia editor, wherein a third user input into the multimedia dashboard application causes the multimedia editor to combine the new multimedia segment with the set of multimedia segments to produce the multimedia promotion without opening another application; and a distribution controller, wherein a fourth user input to the multimedia dashboard application causes the communications module to send the multimedia promotion to at least one of the inventory database and a social media site.

19. The multimedia dashboard application of claim 18, wherein a fifth user input into the multimedia dashboard application causes the multimedia editor to add at least one of closed-captioning, a voiceover track, a background blurring effect, and a background image filter to at least one of the videos and the new multimedia segment.

20. The multimedia dashboard application of claim 18, wherein a fifth user input into the multimedia dashboard application causes the multimedia editor to combine the plurality of photos into a stitched video for the multimedia promotion.

* * * * *